US008295187B1

(12) United States Patent
Toole

(10) Patent No.: US 8,295,187 B1
(45) Date of Patent: *Oct. 23, 2012

(54) PORT-CENTRIC CONFIGURATION METHODS FOR CONVERGED VOICE APPLICATIONS

(75) Inventor: Patrick Joseph Toole, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1430 days.

This patent is subject to a terminal disclaimer.

(21) Appl. No.: 11/190,565

(22) Filed: Jul. 26, 2005

Related U.S. Application Data

(60) Provisional application No. 60/615,303, filed on Sep. 30, 2004.

(51) Int. Cl.
*H04W 24/00* (2009.01)
*H04L 12/24* (2006.01)
*H04L 12/66* (2006.01)
*H04M 15/00* (2006.01)
*G06F 15/173* (2006.01)

(52) U.S. Cl. ........ 370/252; 370/352; 370/353; 370/354; 370/234; 370/356; 379/112.06; 709/223

(58) Field of Classification Search .......... 370/352–356, 370/229–235, 252, 253; 379/32.01, 112.06–112.09, 379/114.06–114.09, 112.06–112.08; 709/223–224
See application file for complete search history.

(56) References Cited

U.S. PATENT DOCUMENTS

| | | | | |
|---|---|---|---|---|
| 5,787,163 | A * | 7/1998 | Taylor et al. | 379/266.08 |
| 6,532,235 | B1 * | 3/2003 | Benson et al. | 370/395.1 |
| 6,788,664 | B1 * | 9/2004 | Thomas et al. | 370/336 |
| 7,009,980 | B1 * | 3/2006 | Cao | 370/395.54 |
| 7,570,587 | B1 * | 8/2009 | Wilson et al. | 370/230 |
| 7,684,322 | B2 * | 3/2010 | Sand et al. | 370/230 |
| 7,688,731 | B2 * | 3/2010 | Haumont et al. | 370/235 |
| 7,688,732 | B2 * | 3/2010 | Manzalini et al. | 370/235 |
| 2003/0181210 | A1 * | 9/2003 | Shipman | 455/446 |
| 2003/0229695 | A1 * | 12/2003 | Mc Bride | 709/224 |
| 2004/0002864 | A1 * | 1/2004 | Yeom | 704/270.1 |
| 2004/0240385 | A1 * | 12/2004 | Boggs et al. | 370/230 |

OTHER PUBLICATIONS

Addressing the GRWA problem in WDM networks with a tabu search algorithm Houle, A.C.; Jaumard, B.; Solari, Y.; Electrical and Computer Engineering, 2005. Canadian Conference on May 1-4, 2005 pp. 1630-1633.*
Kuri et al. "Routing Foreseeable Lightpath Demands Using a Tabu Search Meta-heuristic" Nov. 2002, IEEE.*

(Continued)

*Primary Examiner* — Asad Nawaz
*Assistant Examiner* — Wutchung Chu
(74) *Attorney, Agent, or Firm* — Sheridan Ross P.C.

(57) ABSTRACT

A system for determining a requirement in a converged communication system is provided. The system includes a network analyzer 108 that is operable to:
(a) determine a packet-switched port usage for at least one of (i) a set of packet-switched stations, (ii) a set of packet-switched trunks, and (iii) a set of packet-switched communications, and a circuit-switched port usage for at least one of (iv) a set of circuit-switched stations, (v) a set of circuit-switched trunks, and (vi) a set of circuit-switched communications in at least a portion of an enterprise network; and
(b) based on the determined packet-switched and circuit-switched port usages, determine a functional component requirement to comply with a selected communication specification.

35 Claims, 12 Drawing Sheets

OTHER PUBLICATIONS

Freeman, Roger L., "Chapter 1: Some Basics in Conventional Telephony," Telecommunication System Engineering, (1996) pp. 1-57.*
"Administration for Network Connectivity for Avaya Communication Manager," Avaya 555-233-504, Issue 7 (Nov. 2003), pp. 1-308.
"Administration for Network Connectivity for Avaya Communication Manager," Avaya 555-233-504, Issue 8 (Jun. 2004), pp. 1-276.
"Avaya Application Solutions: IP Telephony Deployment Guide," Avaya 555-245-600, Issue 2 (Nov. 2003), pp. 1-314.
"Avaya Network Routing 2.0: Overview," Avaya Document ID 585-810-001, Issue 2.0 (Apr. 2004), pp. 1-26.
Freeman, Roger L., "Chapter 1: Some Basics in Conventional Telephony," *Telecommunication System Engineering*, pp. 1-57, 1996.
"Sample Avaya S8700 Media Server IP Connect Configuration," Avaya Solution & Interoperability Test Lab Application Notes (Apr. 1, 2002), pp. 1-9.
U.S. Appl. No. 10/671,279, filed Sep. 24, 2003, Callahan et al.
U.S. Appl. No. 10/944,069, filed Sep. 16, 2004, Lo et al.
U.S. Appl. No. 11/087,200, filed Mar. 22, 2005, Lo et al.

* cited by examiner

Fig. 5

Station and Trunk Input: S8700(Stingray)

408: File  Server  Add  Options  System  GOS  Help

Network Region [2]  ◀ ▯ ▶   View Results   Conn Matrix   Reset Reg

Station Collections (402)

| Coll Name | Coll Gtway | Sta Type | Number Sta | BHCs per Sta | CCS per Call | % G711 | % SSup | % Shfl | % Prm |
|---|---|---|---|---|---|---|---|---|---|
| thisoldsta | PNs | IPS-A | 1000 | 10 | 2.0 | 100 | 0 | 0 | |
| StaCollect2 | PNs | IPS-A | 1000 | 10 | 2.0 | 50 | 0 | | |

Trunk Collections (404)

| Coll Name | Coll Gtway | Trk Type | Number Trk | BHCs per Grp | CCS per Call | Num Grps | % G711 | % SSup | % Shfl |
|---|---|---|---|---|---|---|---|---|---|
| TrkCollect1 | PNs | T1-CO | 253 | 4000 | 2.0 | 1 | | | |
| TrkCollect2 | PNs | IP-Tie | 253 | 4000 | 2.0 | 1 | 50 | 0 | |

Fig. 4

Station and Trunk Input: S8700(Stingray)

408: File  Server  Add  Options  System  GOS  Help

Network Region [1]  ◀ ▯ ▶   View Results   Conn Matrix   Reset Reg

Station Collections (402)

| Coll Name | Coll Gtway | Sta Type | Number Sta | BHCs per Sta | CCS per Call | % G711 | % SSup | % Shfl | % Prm |
|---|---|---|---|---|---|---|---|---|---|
| thisoldsta | PNs | DCP | 1000 | 4 | 2.0 | | | | |
| StaCollect2 | PNs | IPS | 1000 | 4 | 2.0 | 50 | 0 | | |

Trunk Collections (404)

| Coll Name | Coll Gtway | Trk Type | Number Trk | BHCs per Grp | CCS per Call | Num Grps | % G711 | % SSup | % Shfl |
|---|---|---|---|---|---|---|---|---|---|
| TrkCollect1 | PNs | T1-CO | 134 | 2000 | 2.0 | 1 | | | |
| TrkCollect2 | PNs | IP-Tie | 134 | 2000 | 2.0 | 1 | 50 | 0 | |

Configuration Results: S8700(Stingray)

Total over all Regions [◄][ ][►]  [Exit]

| | | | | |
|---|---|---|---|---|
| Num BHCs | 23000 | Num CLANs | 11 | |
| Num Stations | 5000 | Num Prwlers | 33 | |
| NumTrunks | 908 | CP POE | 41.6 | % |
| Num PNs | 10 | BHC Limit | 31479 | |
| Num MGs | 0 | IP Voice | 95.6 | Mbps |
| Num R300s | 42 | IP Signaling | 160.0 | Kbps |

} 800

Total over all Classes [◄][ ][►]  [View Capacities]

| | | | | |
|---|---|---|---|---|
| Number of Network Regions | 3 | Classes | 2 | |
| Number of CLANs | 10 | | | |
| Number of Prowlers | Min | 32 | Max | 33 |
| Number of PNs | Min | 10 | Max | 10 |

System Limits: S8700(Stingray)

| [Exit] | Configuration Results | System Limits |
|---|---|---|
| Call POE | 42% | 57% |
| PNs | 10 | 64 |
| MGs | 0 | 80 |
| ROs | 42 | 250 |
| Stations | 5000 | 25,000 |
| Trunks | 908 | 4,000 |
| H323 EPs | 3387 | 10,000 |
| IP Stations | 3000 | 10,000 |
| IP Trunks | 387 | 4,000 |
| Netwrk Regs | 3 | 250 |
| CLANs | 10 | 30 |
| Prowlers | 33 | 50 |
| Sig Groups | 19 | 416 |

Configuration Results: R (G3r)

Total over all Regions ◀ ▯ ▶  [Exit]

| | | | | |
|---|---|---|---|---|
| Num BHCs | 23000 | Num CLANs | 11 | |
| Num Stations | 5000 | Num Prwlers | 33 | |
| NumTrunks | 908 | CP POE | 105.4 | % |
| Num PNs | 10 | BHC Limit | 12437 | |
| Num MGs | 0 | IP Voice | 95.6 | Mbps |
| Num R300s | 42 | IP Signaling | 160.0 | Kbps |

} 800

Total over all Classes ◀ ▯ ▶  [View Capacities]

Number of Network Regions [3]  Classes [2]
Number of CLANs [10]
Number of Prowlers   Min [32]  Max [33]
Number of PNs        Min [10]  Max [10]

| System Limits: R(G3r) | | |
|---|---|---|
| Exit | Configuration Results | System Limits |
| Call POE | 105% | 57% |
| PNs | 10 | 44 |
| MGs | 0 | 80 |
| ROs | 42 | 250 |
| Stations | 5000 | 25,000 |
| Trunks | 908 | 4,000 |
| H323 EPs | 3387 | 10,000 |
| IP Stations | 3000 | 10,000 |
| IP Trunks | 387 | 4,000 |
| Netwrk Regs | 3 | 250 |
| CLANs | 10 | 30 |
| Prowlers | 33 | 50 |
| Sig Groups | 19 | 416 |

PORT-CENTRIC CONFIGURATION METHODS FOR CONVERGED VOICE APPLICATIONS

CROSS REFERENCE TO RELATED APPLICATION

This application claims the benefits under 35 U.S.C. §119 of U.S. Provisional Patent Application Ser. No. 60/615,303, filed Sep. 30, 2004, of the same title and to the same inventor, which is incorporated herein by this reference.

FIELD OF THE INVENTION

The present invention relates to the field of traffic engineering and configuration of switching systems for voice traffic that is carried over traditional time division multiplexed (TDM) facilities and Internet Protocol (IP) data facilities.

BACKGROUND OF THE INVENTION

Prior to the implementation of Voice over Internet Protocol or IP (VoIP), the basic methodology used in configuring private branch exchange (PBX) systems remained unchanged for many years. These methods remain valid for non-IP switching systems and, in this application, are documented in the original AT&T 555-series traffic manuals.

The primary focus of the older systems was on the call usage for stations (e.g., circuit-switched telephones) and trunks. A call is a switched, connection between two ports. Call usage is the total connection time for all calls for a given period of time. Call usage is traditionally partitioned into components (such as trunk-to-station (incoming), station-to-trunk (outgoing), station-to-station (intercom), and trunk-to-trunk (tandem) calls) using a call tree. Given this partition, traditional methods assume a balanced system and use tables to derive the traffic load on system components, such as the port network Time Division Multiplexed or TDM buses. A "balanced system" refers to a system in which the traffic load is uniformly distributed among all network switching components, such as TDM buses, while an "unbalanced system" refers to a system in which the traffic load is non-uniformly distributed among all switching components. For example, the impact of outgoing trunk calls on the TDM bus is calculated using a first port network preference link table that was originally derived by a Bell Labs mathematician. System components that are configured include port network time slots, trunk groups, tone resources, announcement resources, inter-port network links, and processor occupancy.

The inclusion of IP stations and trunks in a single system required a separate calculation for media processor and Control Local Area Network (C-LAN) resources. The TDM and other calculations remained the same. When shuffling and multiple network regions were introduced, the calculations were changed to include some workarounds. These methods were acceptable for small-scale deployment of IP stations and trunks. The advent of large scale, multiple network region deployment, IP center-stage connect, and new types of non-traditional port networks and gateways, however, require a complete rethinking of the configuration methods.

Converged PBX systems, in particular, have introduced multiple layers of complexity into the modeling of communication networks. Converged PBX voice systems carry traffic over both TDM and IP data facilities. As a result of the increasingly widespread use of converged PBX systems, single enterprise switching networks may now have stations, trunks, and processing gateways dispersed over several continents as a highly unbalanced system. Furthermore, calculations based on call usage have become overwhelmingly complex due to the statistically large number of call type combinations that are possible. The advent of IP has increased dramatically the number of types of calls for a balanced system let alone for an unbalanced system. For example, in an enterprise with n network regions, the number of call usages that would require estimation would increase n-fold.

SUMMARY OF THE INVENTION

These and other needs are addressed by the various embodiments of the present invention. The present invention is generally directed to a network analysis agent that uses port usage to determine one or more system requirements to meet specified communication specifications (e.g., grade or quality of service constraints or specifications). As will be appreciated, a "port" refers to a virtual or physical point of connection for a communication. Common types of ports include circuit-switched or packet-switched trunk or station ports. A port can have an electronic address, such as an IP or MAC address. "Port usage" is the amount of time port groups of different types are busy (e.g., off-hook and/or carrying voice communications) during a given time period, typically the busy hour. In a preferred configuration, port usage is totaled for stations and trunks by network region and divided into packet-switched (e.g., IP) and circuit-switched (or non-IP) groups.

In a first embodiment, the invention uses descriptive algebra and a collection of computational methods to determine, for a network region or collection of network regions (i.e., class), volumetric system (hardware) requirements such as a required number of port networks, bearer and/or signal channel media processors, media modules, Digital Signal Processor or DSP resources, media gateways, tone detection resources, announcement resources, TDM time slots, a number of signaling sockets, and trunks and data network traffic impact and bandwidth usages. The building blocks of the embodiment are IP stations, IP trunks, circuit-switched stations, and circuit-switched trunks. Usage information for stations and trunks is used to build up total port usages on a network-region basis. This information is then transformed into intra-network and inter-network region traffic. Intra-network and inter-network region traffic is then used in a series of algorithms to configure system resources and data network load.

In one embodiment, these algorithms are integrated readily into an object-oriented approach for software application development. Station and trunk collection objects can have corresponding traffic parameters, gateway assignments, and other parameters assigned as input, such as either from a User Interface or UI or from an Extensible Markup Language or XML file. These collections are in turn built up as part of a region object. Associated regions are collected in a network class object. The collection of classes is the switch.

The present invention can have a number of advantages relative to conventional techniques. For example, the invention avoids the complexity of call trees by using port centric methods to provide network configuration and capacity or bandwidth information. Port usage can be easily and reliably extrapolated into equipment loads. The invention can provide an accurate configuration of a complex converged system without requiring a detailed enumeration of all of the call flows of the system, regardless of the number of call types involved. Using the invention, modifications to accommodate changes or new communication technology, either packet- or circuit-switched, can be implemented easily. The invention can effect configuration not only for balanced but also for highly unbalanced systems. Port usage can allow for realistic allocation of a traffic load throughout a highly decentralized network comprising both IP and TDM components.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

These and other advantages will be obvious to one of ordinary skill in the art based on the detailed discussion of the invention presented below.

BRIEF DESCRIPTION OF THE DRAWINGS

FIG. 4 is a station and trunk input screen shot depicting first input into the network analyzer for a first enterprise network configuration;

FIG. 5 is a station and trunk input screen shot depicting first input into the network analyzer for the first network configuration;

FIG. 8 is a configuration results screen shot depicting first output from the network analyzer for the first network configuration;

FIG. 9 is a system limits screen shot depicting second output from the network analyzer for the first network configuration;

FIG. 10 is a configuration results screen shot depicting first output from the network analyzer for a second network configuration;

FIG. 11 is a system limits screen shot depicting second output from the network analyzer for the second network configuration;

DETAILED DESCRIPTION

The Architecture

Figure 1:
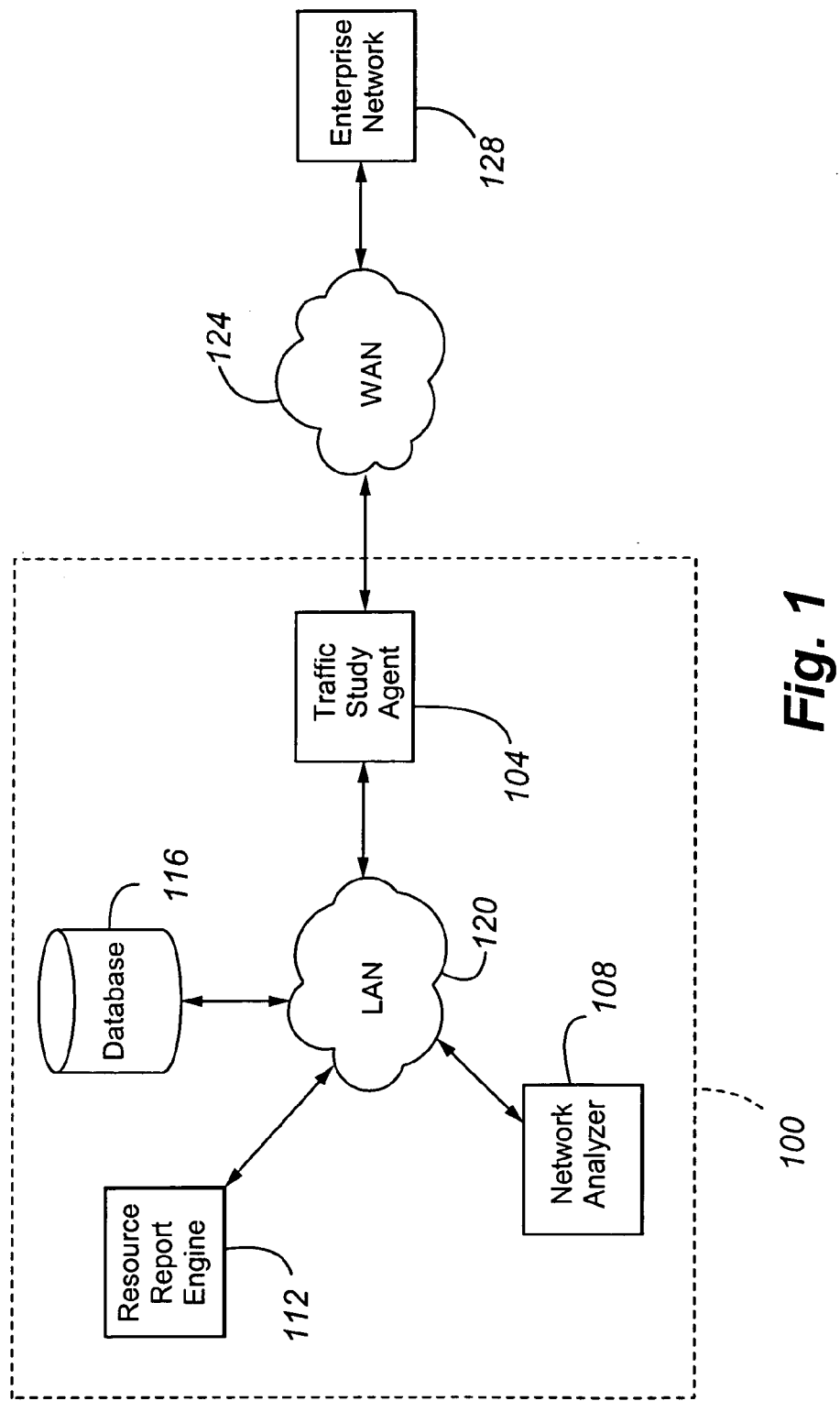
FIG. 1 is a block diagram of a network traffic analysis system according to a first embodiment of the present invention.

FIG. 1 depicts a Web-based network traffic analysis system 100 according to an embodiment of the present invention. The system 100 is connected via a Wide Area Network or WAN 124 to an enterprise network 128 that is to be analyzed by the system. To effect the analysis of the enterprise network 128, the system 100 includes a traffic study agent 104, such as Avaya Inc.'s Traffic Study Expert™, that periodically contacts a switch or server (not shown) in the enterprise network 128 (such as using Avaya Inc.'s Universal Product Access™ tool) to obtain traffic data for the network 128; a network analyzer 108 that, based on the collected traffic data and on grade and/or quality of service constraints, determines hardware requirements and system limits for the enterprise network 128; a resource report engine 112 that analyzes and filters the collected traffic data to provide system administration and/or diagnostic reports at the resource and enterprise levels; and a database 116 to store traffic data, reports, and other information needed by the system components. The various components of the system 100 are in communication via Local Area Network or LAN 120.

The network analyzer 108 determines, for a network region or collection of network regions (i.e., class), one or more volumetric traffic sensitive system (hardware) requirements, such as a required number of port networks, bearer or signal channel media processors, media modules, Digital Signal Processors or DSP resources, media gateways, tone detection resources, announcement resources, TDM time slots, signaling sockets, and trunks and data network traffic impact and/or bandwidth usage.

As will be appreciated, port networks and gateways provide similar functionalities. Port networks and gateways act as electronic signal repeaters and protocol converters and support both packet-switched and circuit-switched stations and provide other functions such as detecting and/or generating DTMF tones playing audio (music and/or voice) announcements, shaping traffic, managing connections, and performing call admission control. Stations are connected to the port network or gateway by ports. Port networks typically include IP Service Interface or IPSI modules and signaling and bearer channel media processors. Gateways typically include various media modules for performing a variety of functions such as providing access ports for different types of stations and trunks and converting voice and signaling data between packet-switched and circuit-switched protocols. Examples of gateways include Avaya Inc's SCC1™, MCC1™, CMC™, G350™, G600™, G650™, and G700™

The Data Structures

Figure 2:
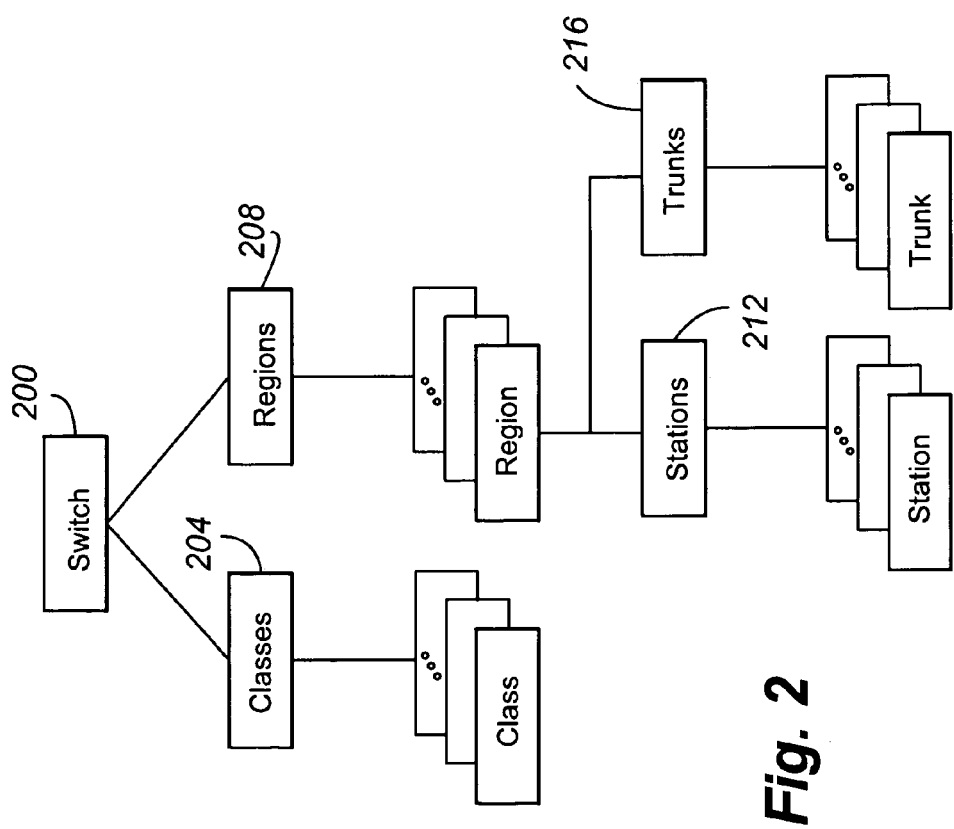
FIG. 2 is a block diagram of data structures used by the system of FIG. 1.

The network analyzer 108 relies on a number of data structures in performing network analysis. These data structures are illustrated in and discussed with reference to FIG. 2.

At the highest level is the switch object 200. The switch 200 provides connection paths on demand between trunk and station ports for real time voice transmittal. The switch object 200 can correspond not only to a switch, such as a PBX, but also a media server, such as Avaya Inc.'s G3r™, G3si™, G3csi™, S8100™, S8300™, S8500™, S8700™, and S8710™ servers.

At the next highest level is the network region object 208 and class object 204.

The network region object 208, which is an instantiation of the region class, commonly corresponds to instances of an enterprise LAN-type entity. Examples of LANs include geographically remote sites and branch offices. A network region commonly includes a gateway and/or port network and collection(s) of trunks, ports, and stations. A network region may also include a switch or media server. IP components with common network region identifiers can communicate with one another or to a media processor, such as Avaya Inc.'s Prowler™, using local codec preferences. Network regions are connected by an Inter Region Connection Matrix or IRCM. The (i,j) entry of this matrix is either left blank, indicating no IP connection between regions i and j, or is assigned a codec preference list number to be used in connection establishment. IP components (e.g., a media processor board, a C-LAN board, a signaling group, and the IP stations) may be assigned to a network region either through system administration or as part of a registration process (e.g., H.323 registration). The use of network regions takes into account that traffic can be very different in different network regions.

Although the packet-switched components are identified specifically as IP components, it is to be understood that the components may use packet-switched protocols other than IP. In other words, the use of "IP" is not intended to limit the scope of the present invention only to the TCP/IP suite of packet-switched protocols.

The class object 204 is a grouping of network regions connected such that a path (using the IRCM) exists between any two regions in the group. One of the properties of the class object is the strength of the connection of the class members. A network class is strongly connected if any two network regions in the class are directly connected using the IRCM. A network class is weakly connected if at least two regions are not directly connected using the IRCM.

At the lowest level are the station and trunk collection objects 212 and 216.

Each station object 212 is an instantiation of the station collection class. Each station object represents typically not a single station but a collection of stations of the same type. Stations can be circuit-switched and/or packet-switched. Specific types of stations include Digital Control Protocol or DCP devices, Basic Rate Interface or BRI devices, analog devices, single connect IP devices, dual connect IP devices, and wireless devices.

Each trunk object is an instantiation of the trunk collection class. A trunk object is a collection of trunk groups of the same type with the same traffic profile. Trunks can be circuit-switched or packet-switched. Specific types of trunks include T1, E1, analog, BRI, and IP trunks, and further options among the T1 and E1 trunk types include Direct Inward Dialing or DID, central office or CO, tie, and Primary Rate Interface or PRI trunks, in the analog trunk type DID, CO, and tie, trunks, and in the IP trunk type tie and DID trunks. As with stations, the type is a property that is specified. Each trunk group in the collection is assumed to have the same number of trunks. The number of trunks per group is a property that is usually not specified but instead depends on other specified properties, such as the grade or quality of service, the carried load, and the grade of service algorithm.

Although the stations or trunks in a collection are all of the same type, it is to be understood that a region can have two collections of the same type with possibly different traffic profiles.

A port collection, as used herein, refers to either a collection of stations or trunks. The port collection can be partitioned into IP ports and circuit-switched ports.

The inclusion of time slot-connected station and trunk objects within the definition of network region provides flexibility in configuring resources, such as trunks. It is appropriate to place circuit-switched components into network regions along with packet-switched components as the center stage switch is packet-switched. As will be appreciated, the center stage switch is a connection hub that provides port network communication.

Operation of the Network Analyzer

Figure 3:
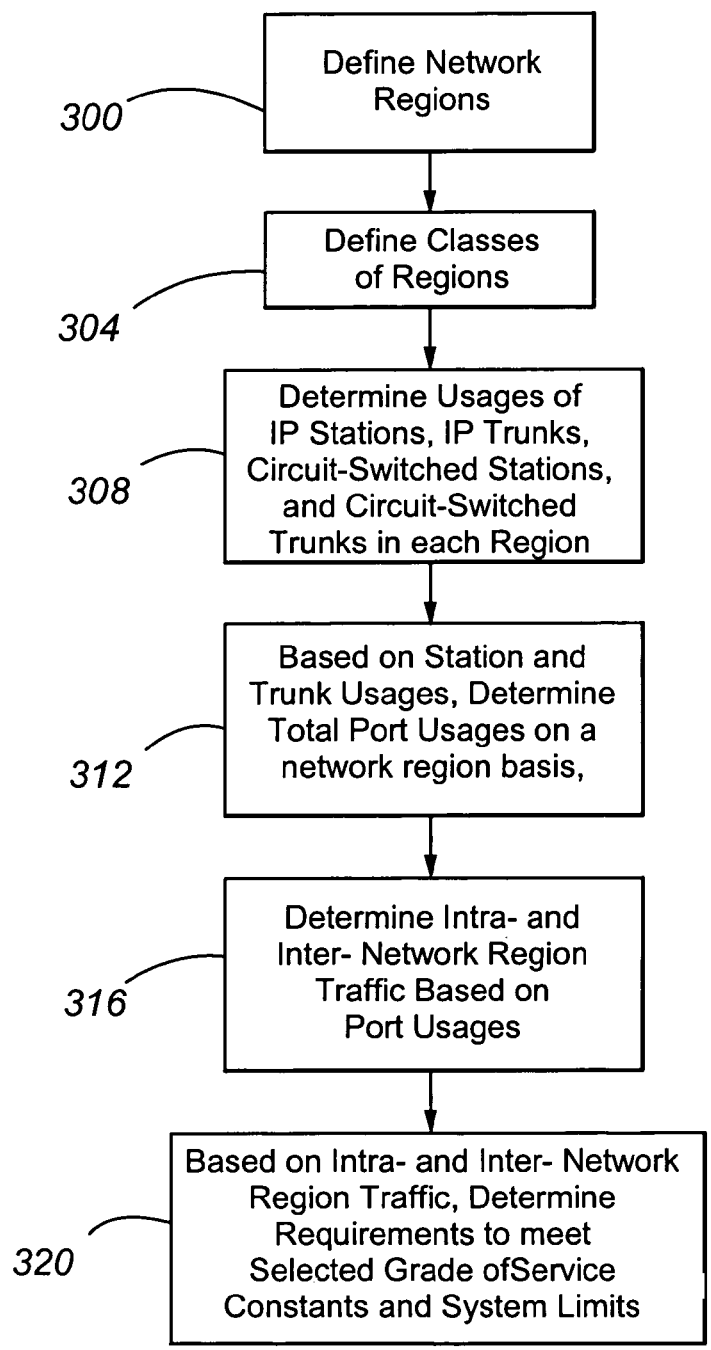
FIG. 3 is an operational flow chart of a network analyzer of the system of FIG. 1.

The operation of the network analyzer will now be discussed with reference to FIG. 3.

In step 300, the various network regions in the enterprise network are defined.

In step 304, the network regions are grouped into classes based on their IRCM connectivity.

In step 308, the usages of IP stations, IP trunks, circuit-switched stations, and circuit-switched trunks in each region are determined, such as using the traffic study agent 104 and/or by other traffic data collection techniques.

Figure 14A:
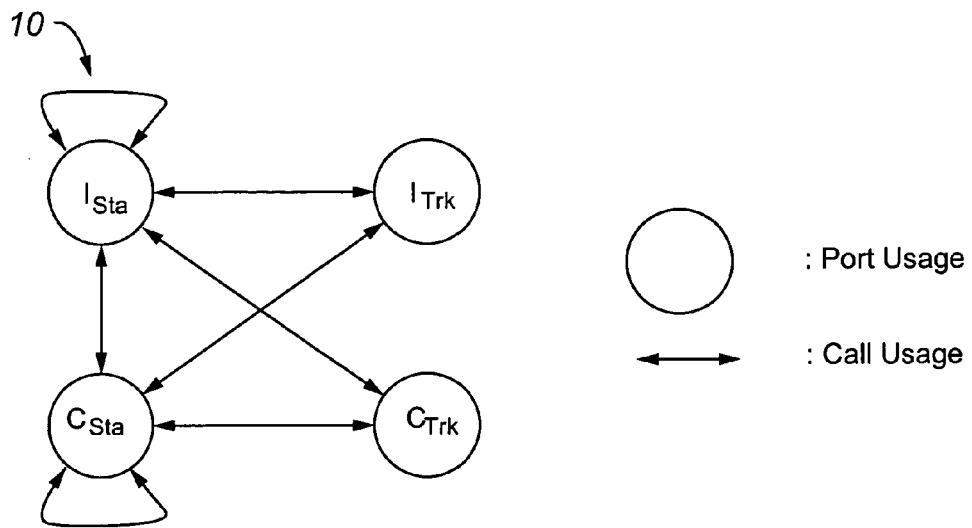
FIGS. 14A and 14B show block diagrams representative of call usage and port usage for a converged telecommunication system.
Figure 14B:
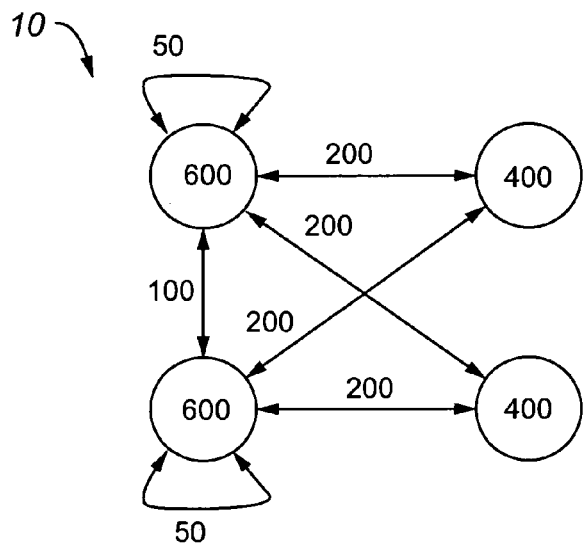

In step 312, the station and trunk usages are used to determine total port usages in each network region. This determination is known to those of ordinary skill in the art. FIGS. 14A and 14B, for example, show block diagrams representative of call usage and port usage for a converged telecommunication system. As shown in FIG. 14A, the system 10 comprises IP stations $I_{Sta}$, circuit-switched stations $C_{Sta}$, IP trunks $I_{Trk}$ and circuit-switched trunks $C_{Trk}$. As will be appreciated, the nodes represent port usage and the arcs call usage. FIG. 14B shows exemplary values for the call usage and the port usage. In FIG. 14B, for example, the intra-IP station call usage is 50 Erlangs, the inter-station call usage between the IP stations and the circuit-switched stations is 100 Erlangs, the call usage between the IP stations and the IP trunks is 200 Erlangs and the call usage between the IP stations and the circuit-switched trunks is 200 Erlangs. As shown in FIG. 14B, this total usage for the IP stations can be represented as a port usage, which in this case is 600 Erlangs.

Figure 6:
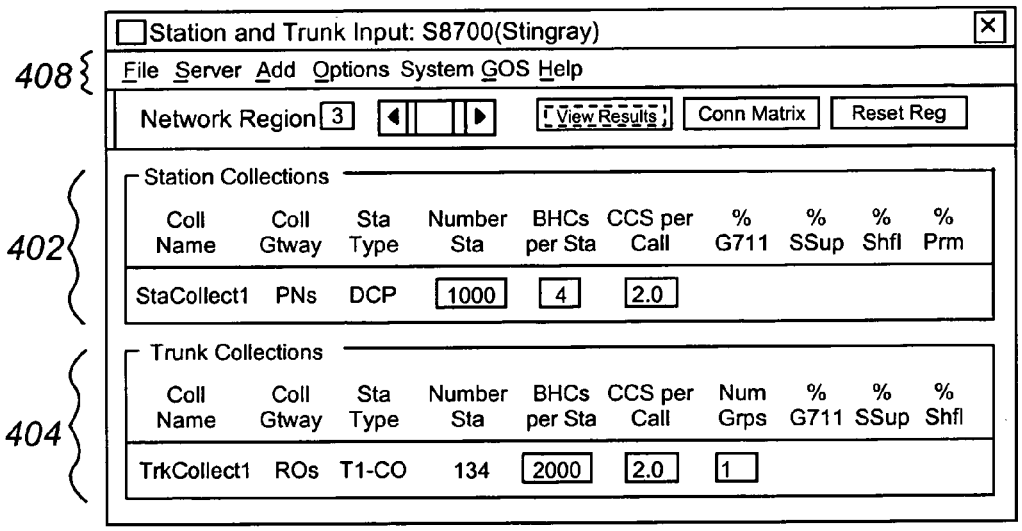
FIG. 6 is a station and trunk input screen shot depicting first input into the network analyzer for the first network configuration.

FIGS. 4-7 depict the network analyzer input from steps 300-312. FIG. 4 corresponds to a first network region; FIG. 5 to a second network region; and FIG. 6 to a third network region of an enterprise network. With reference to FIGS. 4,-6, station and trunk collections 402 and 404 are presented. In FIG. 4, for example, two station collections are shown, namely the first station collection named "thisoldsta" and the second station collection named "StaCollect2". Each of the station collections has the same type of resource under the column "Coll Gtway" or "Collection Gateway", namely Port Networks or PNs. Other types of resource options for this column include media gateways and remote offices. Under the column "Sta Type" or "Station Type" the first station collection is comprised of DCP telephones while the second station collection is comprised of single connect IP devices. Additional information for each station collection includes the number of stations in the column "Number Sta", busy hour calls per station (or the average number of calls per station in the collection) in the column "BHCs per Sta", centi-call seconds per call (or the average length of a call) in the column "CCS per Call", the percentage of (IP) port usage that is encoded using a specified codec in the column "% G711", the percentage of port usage using silence suppression (which transmits only active voice and not silence during a call) in the column "% Ssup", the percentage of port usage that shuffles in the column "% Shufl" and finally the percentage of port usage registered as permanent mode users in the column "% Prm %. Assuming that shuffling is always enabled, the "% Shufl" can be replaced by "% IP-IP" which represents, for IP station collections, the percent of port usage that originates or terminates at other IP endpoints. For example, a group of call center agents using IP phones using T1 trunking may have 0% IP-IP. Two trunk collections are shown in FIG. 4, namely the first trunk collection named "TrkCollect1" and the second trunk collection named "TrkCollect2". Each of the trunk collections has the same type of resource under the column "Coll Gtway", namely PNs. Under the column "Trk Type" or "Trunk Type" the first trunk collection is comprised of T1-CO trunks while the second trunk collection is comprised of IP-Tie trunks. Additional information for each trunk collection includes the number of trunks in the column "Number Trk" (which is usually calculated by multiplying the number of trunk groups times the number of trunks per group (which is calculated from the traffic load per group and grade of service)), average busy hour calls per trunk group in the column "BHCs per Grp", average centi-call seconds per call for the trunk group in the column "CCS per Call", the number of trunk groups of that type in the collection in the column "Num Grps", the percentage of port usage encoded using a specified codec in the column "% G711", the percentage of port usage using silence suppression in the column "% SSup", and the percentage of calls that shuffles in the column "% Shufl".

In the tool bar 408, there are a number of user selections, including "Server", "Options", and "System GOS" or system grade of service. "Server" refers to the Switch object 200 and is set for all network regions. "Options" includes a number of options including call center usage (which can be set as low, medium, or high), remote office, and media gateway (which can be configured for local survivable processors in the network region and percent of calls that terminate on a port network). System grade of service options include none, P001, P01, P02, and P1.

Figure 7:
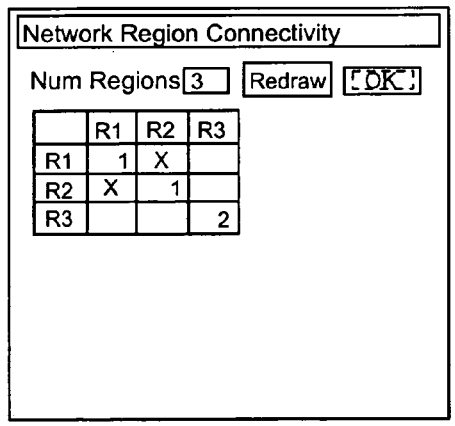
FIG. 7 is a network region connectivity matrix screen shot depicting second input into the network analyzer for the first network configuration.

FIG. 7 is a network region connectivity matrix. In the matrix, the first network region is denoted by "R1", the second network region by "R2", and the third network region by "R3". The "X" indicates connectivity between the network regions; thus the first and second network regions are connected but the third network region is not connected to either the first or second network region. The number "1" indicates the first and second network regions are in a first class, and the number "2" indicates that the third network region is in a second class. When a class is strongly connected, the number is in bold font and, when a class is weakly connected, the number is in normal font.

In steps 316 and 320, intra- and inter-network region traffic is determined based on port usages and, based on the intra- and inter-network region traffic, enterprise system requirements are determined to meet selected grade of service constraints and system limits. The output properties determined for each region and collectively for the enterprise network include processor occupancy and the numbers of signaling channel media processors (e.g., CLANs™), bearer channel media processors (e.g., Prowlers™), port networks, media gateways, and media modules of each type (i.e., DCP, T1, E1, DSP, BRI, and analog). These determinations are made using the mathematical equations set forth below.

Mathematical Equations

Assumptions

The equations below make a number of assumptions. These assumptions include:

(a) A port network and all of its IP components are identified with a single network region.

(b) For configuration purposes, all station and trunk collections, both IP and not-IP, have an assigned network region.

(c) All IP endpoints support shuffling.

(d) All network classes are strongly connected.

(e) All trunk calls are non-tandem.

(f) Calls are uniformly distributed between ports based_only on the port usage magnitudes or usage from a single port terminates on another port based only on that port's usage magnitude.

(g) For all types of circuit calls, the probability of inter-port network linking is $$\frac{(n-1)}{n},$$

where n is the number of port networks.

(h) All media modules endpoints require PCM-to-IP conversion, which will increase slightly the DSP load.

(i) IP-to-IP calls always shuffle.

(j) Calculations are performed on a region-by-region basis.

(k) The Internal Communications Controller or ICC processor, media gateway processors, and media gateway TDMs can never be overloaded.

In the equations, the following relationships are employed:

(a) R=Set of network regions for the system;

(b) C=Set of network Classes for the system (note that C partitions the members of R);

(c) $S_R$=Set of station collections in network region R, R∈R;

(d) $T_R$=Set of trunk group collections in network region R, R∈R;

(e) $P_R = S_R \cup T_R$=Set of port collections in network region R, R∈R (The set of port collections can also be partitioned into IP ports and circuit switched ports);

(f) $I_R$=Set of IP port collections in network region R, R∈R;

(g) $C_R$=Set of circuit switched port collections in network region R, R∈R; and (h) $P_R = I_R \cup C_R$.

Each station or trunk group collection in a given network has traffic usage parameters specified that allow for the calculation of the associated port usage rate:

$Num_i$, $Call_i$, $CCS_i$: Number of stations, calls per station, CCS per call, station collection i;

$Num_j$, $Call_j$, $CCS_j$: Number of trunk groups, calls per group, CCS per call, trunk collection j; and $$Usg_i = \text{port usage rate for station or}$$
$$\text{trunk group collection } i, \text{ in Erlangs}$$
$$= Num_i \times Call_i \times CCS_i \div 36.$$

Summing over all the collections in the regions yields a region port usage rate (PUR):

$$P^R = \text{Total port usage rate in network region } R$$
$$= \sum_i Usg_i : i \in R.$$

The region port usage rate (PUR) can also be divided into the circuit-connected and IP-connected total by summing over the collection port usage rates in those respective groups.

$$P^R = I^R + C^R,$$

where $I^R$ and $C^R$ are the IP- and circuit-connected port usage rate results for region R.

IP port collections also have specified the fraction of usage that uses the G.711 codec and the remainder is assumed to use a compression codec: G.729 or (rarely) G.723.

$f\_G711^i$=fraction of IP port collection i usage that is G.711.

The compression codecs use two bearer channel media processor (MP) ports. If all IP ports in a region required PCM-IP conversion the usage calculation would be:

$P\_MP^R$ = bearer $MP$ usage for connected port traffic, in G711 equivalent Erlangs.

$$= \left(\sum_i Usg_i \times (2 - f\_G711^i) : i \text{ is an } IP \text{ port collection in } R\right).$$

Port Usage Algebra

For any given class, the following definitions are assigned:

I, C: the port usage rates for IP port collection usage and circuit port collection usage, respectively, summed over all collections in the class. Let $I^R$, $C^R$ be the corresponding results for region R in the class.

II, IC, CI, CC: class level port usage rates for IP to IP, IP to Circuit, Circuit to IP, and Circuit to Circuit, respectively. Note that I=II+IC, and C=CI+CC. Let $II^R$, $IC^R$, $CI^R$, and $CC^R$ be the corresponding results for region R.

$I_{Sta}$, $I_{Trk}$, $C_{Sta}$, $C_{Trk}$, $P_{Sta}$, $P_{Trk}$: class level port usage rates for IP stations, IP trunks, circuit stations, circuit trunks, stations, and trunks. Note that $P_{Sta}=I_{Sta}+C_{Sta}$, $P_{Trk}=I_{Trk}+C_{Trk}$, $I=I_{Sta}+I_{Trk}$, and $C=C_{Sta}+C_{Trk}$. Let $I_{Sta}^R$, $I_{Trk}^R$, $C_{Sta}^R$, $C_{Trk}^R$, $P_{Sta}^R$ and $P_{Trk}^R$ be the corresponding results for region R.

Consider II, the port usage rate from IP ports in the class that terminates on IP ports in the class. It has components: IP station to IP trunk, IP trunk to IP station, and IP station to IP station. Using the port usage proportion assumption and summing yields:

$$II = I_{Sta} \times \left\{2 \times \frac{I_{Trk}}{P_{Sta}} + \left(1 - \frac{P_{Trk}}{P_{Sta}}\right) \times \frac{I_{Sta}}{P_{Sta}}\right\}$$

Using a similar argument, $$IC = I_{Sta} \times \left\{\frac{C_{Trk}}{P_{Sta}} + \left(1 - \frac{P_{Trk}}{P_{Sta}}\right) \times \frac{C_{Sta}}{P_{Sta}}\right\} + I_{Trk} \times \frac{C_{Sta}}{P_{Sta}}$$

$$CI = C_{Sta} \times \left\{\frac{I_{Trk}}{P_{Sta}} + \left(1 - \frac{P_{Trk}}{P_{Sta}}\right) \times \frac{I_{Sta}}{P_{Sta}}\right\} + C_{Trk} \times \frac{I_{Sta}}{P_{Sta}}$$

Note that $IC = CI$.

$$CC = C_{sta} \times \left\{2 \times \frac{C_{Trk}}{P_{Sta}} + \left(1 - \frac{P_{Trk}}{P_{Sta}}\right) \times \frac{C_{Sta}}{P_{Sta}}\right\}$$

$II^R$ is the IP port usage in region R that terminates on an IP port somewhere in the class. $IC^R$, $CI^R$, and $CC^R$ have analogous definitions.

$$II^R = I_{Sta}^R \times \left\{2 \times \frac{I_{Trk}}{P_{Sta}} + \left(1 - \frac{P_{Trk}}{P_{Sta}}\right) \times \frac{I_{Sta}}{P_{Sta}}\right\} + I_{Trk}^R \times \frac{I_{Sta}}{P_{Sta}}$$

$$IC^R = I_{Sta}^R \times \left\{\frac{C_{Trk}}{P_{Sta}} + \left(1 - \frac{P_{Trk}}{P_{Sta}}\right) \times \frac{C_{Sta}}{P_{Sta}}\right\} + I_{Trk}^R \times \frac{C_{Sta}}{P_{Sta}}$$

$$CI^R = C_{Sta}^R \times \left\{\frac{I_{Trk}}{P_{Sta}} + \left(1 - \frac{P_{Trk}}{P_{Sta}}\right) \times \frac{I_{Sta}}{P_{Sta}}\right\} + C_{Trk}^R \times \frac{I_{Sta}}{P_{Sta}}$$

Note that in general, $CI^R \neq IC^R$.

$$CC^R = C_{Sta}^R \times \left\{\frac{C_{Trk}}{P_{Sta}} + \left(1 - \frac{P_{Trk}}{P_{Sta}}\right) \times \frac{C_{Sta}}{P_{Sta}}\right\} + C_{Trk}^R \times \frac{C_{Sta}}{P_{Sta}}$$

$CC^{RR}$ is the circuit port usage in region R that terminates on a circuit port somewhere in region R $$CC^{RR} = C_{Sta}^R \times \left\{2 \times \frac{C_{Trk}^R}{P_{Sta}} + \left(1 - \frac{P_{Trk}^R}{P_{Sta}}\right) \times \frac{C_{Sta}^R}{P_{Sta}}\right\}$$

$CC^{RO}$ is the circuit port usage in region R that terminates on a circuit port somewhere outside region R $$CC^{RO} =$$

$$(C_{Sta} - C_{Sta}^R) \times \left\{\frac{C_{Trk}^R}{P_{Sta}} + \left(1 - \frac{P_{Trk}^R}{P_{Sta}}\right) \times \frac{C_{Sta}^R}{P_{Sta}}\right\} + (C_{Trk} - C_{Trk}^R) \times \left\{\frac{C_{Sta}^R}{P_{Sta}}\right\}$$

Note that $CC = \sum_R CC^R$ and that $CC^R = CC^{RR} + CC^{RO}$

Bearer Channel Media Processor Algebra

All of the port definitions and derivations above that involve IP ports can be extended to represent a specific codec, e.g., G.711, equivalent port usage instead of port usage. For example, $$D = \sum_i (Usg_i \times (2 - f\_G711^i)) \quad (i \text{ is an } IP \text{ collection in the class})$$

is the IP to IP G.711 codec usage in the class. The IP station calculation is:

$$D_{Sta} = \sum_i (Usg_i \times (2 - f\_G711^i)) \quad (i \text{ is an } IP \text{ station collection in the class}).$$

Using an analogous formula, the quantities $D_{Trk}$, $D_{Sta}^R$, and $D_{Trk}^R$ can be defined. The circuit-to-IP usage results (CI, $CI^R$) can be expressed in the G.711 codec equivalents (CD, $CD^R$):

$$CD = DC = D_{Sta} \times \left\{\frac{C_{Trk}}{P_{Sta}} + \left(1 - \frac{P_{Trk}}{P_{Sta}}\right) \times \frac{C_{Sta}}{P_{Sta}}\right\} + D_{Trk} \times \frac{C_{Sta}}{P_{Sta}}$$

$$CD^R = C_{Sta}^R \times \left\{\frac{D_{Trk}}{P_{Sta}} + \left(1 - \frac{P_{Trk}}{P_{Sta}}\right) \times \frac{D_{Sta}}{P_{Sta}}\right\} + C_{Trk}^R \times \frac{D_{Sta}}{P_{Sta}}$$

When center stage IP traffic goes between bearer channel media processors (e.g., Avaya Prowlers™) in different regions, the codec used will depend on the IRCM entry. To keep the model simple, assume that we have a fraction $f\_G711^{RR}$ available, which is the fraction of the intra-region inter-port network traffic of region R that is G.711 codec, and a fraction $f\_G711^{RO}$ which is the fraction of the inter region inter port network traffic of region R that is G.711 codec. These results permit the definitions for maximum G.711 codec center stage data usage (CSD) that is intra region ($CSD^{RR}$) and inter region ($CSD^{RO}$):

$$CSD^{RR} = CC^{RR} \times (2 - f\_G711^{RR})$$

$$CSD^{OR} = CC^{RO} \times (2 - f\_G711^{RO})$$

Summing these results yields the G.711 codec usage at the region and at the class level:

$$CSD^R = CSD^{RR} + CSD^{RO}$$

$$CSD = \sum_R CSD^R$$

Algorithm for Calculating the Minimum Number of Port Networks

If there is no port network linkage, the circuit-to-circuit traffic uses CC÷2 Erlangs of TDM usage. The IP-to-circuit traffic uses CI Erlangs of TDM traffic, because the IP endpoint call shuffles to the bearer channel media processor on the port network of the circuit endpoint. Note also that:

$$1 + \frac{n-1}{n} = \frac{2 \times n - 1}{n}$$

1. Calculate DLCI (see below).
2. n=max (CI+CC÷200, DLCI÷2480), rounded up

3. $\text{TDM\_Use}(n) = \left\{ CI + CC \times \frac{2 \times n - 1}{2 \times n} \right\}$ 4. If TDM_Use(n)÷n<200, then minPN=n. Otherwise, replace n with n+1 and repeat Step 3.

Algorithm for Calculating the Maximum Number of Port Networks

The maximum number of port networks is derived by calculating the number required in each region and summing over all regions in the class. It may desirable to use the region result for some of the regions, resulting in a value for the number of port networks between the minimum and the maximum.

The call usage that can link inside the region is $CC^{RR} \div 2$. The $CC^{OR}$ and $CI^R$ port usages both require TDM time slots in the region. The $II^R$ and $IC^R$ do not impact the region's TDM resource.

1. Calculate $DLCI^R$ (see below).
2. n=max(($CC^{RR}+CC^{OR}+CI^R$)÷200, $DLCI^R$ required÷2500), wherein the result is rounded up.

3. $\text{TDM\_Use}(n) = CC^{RR} \times \frac{2n-1}{2n} + CC^{OR} + CI^R$

4. If TDM_Use(n)÷n<200, then $PN^R$=n. Otherwise, replace n with n+1 and repeat Step 3.
5. Sum the $PN^R$ over all regions in the class to obtain maxPN.

In the algorithms to follow, GOS(x) is the grade of service function that returns the number of bearer channel media processor ports required if x is the G.711 codec carried load. Using an average of an Erlang B and Erlang C results will approximate retrials. P001 is the grade of service recommended.

Data Link Control Identifier (DLCI) Algebra

A single IP Service Interface (IPSI) board in a port network, for example, may comprise a pool of 2560 Data Link Control Identifiers (DLCIs) for signaling links. In one embodiment, eighty (80) of these are reserved and 2480 are available. For this embodiment, the DLCI calculation is the same as the signaling channel media processor (C-LAN) usage calculation shown above. For single connect IP stations, the IP station (port) usage equals the number of IP stations registered as follows:

IP station usage=number registered (fixed use).

For the IP tie trunks, the (port) usage equals the number of signaling groups used as follows:

IP tie trunks usage=number of signaling groups used.

As an approximation in this embodiment, the total number of trunks in a group may be divided by 31 and multiplied by the number of groups, which is fixed. In addition, the IP DID trunks can be calculated as follows:

IP DID trunks=2×call usage (variable).

The Integrated Services Digital Network or ISDN D channels (PRI and BRI) comprise a fixed number of channels. Avaya Inc.'s Audix™, CMS™ and CDR™ applications usage equals two CCS per application, which is fixed. The telecommuter station usage comprises the number of registered stations, which is fixed. The dual connect permanent mode IP stations usage comprises two CCS per application, which is also fixed. Finally, the dual connect as-needed mode IP stations usage comprises the number of stations registered (fixed) and the total station usage (variable).

Where TFU represents the Total Fixed Usage, and TVU represents the Total Variable Usage, the number of IPSI boards, and hence the number of port networks, can be estimated as follows:

1. Let n=(TFU+TVU)/2480, where the result is rounded up. However, if TVU=0, this is the answer.
2. Calculate (TFU+GOS(TVU/n))/n, where GOS(x) is the grade of service function returning the number of servers for the carried load x. P001 is the desired grade of service.
3. If the result in step 2 is less than 2480, n is the answer. Otherwise replace n with n+1 and repeat step 2.

Tandem Usage Algebra

As discussed above, where tandem traffic is to be accounted for, the following calculations may be used in the calculations listed above. In one embodiment, for example, the tandem trunk port usage is broken out in the circuit traffic ($C_{Tdm}$), the IP traffic ($I_{Tdm}$) and the total traffic ($P_{Tdm}$), where:

$$P_{Tdm} = C_{Tdm} + I_{Tdm}$$

Further, the calculations required where the tandem traffic is to be accounted for are as follows:

$$CI_{Tdm} = C_{Tdm} \times \frac{I_{Tdm}}{P_{Tdm}}$$

$$CC_{Tdm} = C_{Tdm} \times \frac{C_{Tdm}}{P_{Tdm}}$$

$$CI_{Tdm}^{RR} = C_{Tdm}^R \times \frac{C_{Tdm}^R}{P_{Tdm}}$$

$$CI_{Tdm}^{RO} = (C_{Tdm} - C_{Tdm}^R) \times \frac{C_{Tdm}^R}{P_{Tdm}}$$

$$CI_{Tdm}^R = C_{Tdm}^R \times \frac{I_{Tdm}}{P_{Tdm}}$$

$$CD_{Tdm} = C_{Tdm} \times \frac{D_{Tdm}}{P_{Tdm}}$$

$$CD_{Tdm}^R = C_{Tdm}^R \times \frac{D_{Tdm}}{P_{Tdm}}$$

$$CSD_{Tdm}^{RR} = CC_{Tdm}^{RR} \times (2 - \text{f\_G711}^{RR})$$

-continued $$CSD_{Tdm}^{RO} = CC_{Tdm}^{RO} \times (2 - f\_G711^{RO})$$

$$CSD_{Tdm}^{R} = CSD_{Tdm}^{RR} + CSD_{Tdm}^{RO}$$

The results from these calculations can be added into the corresponding non-tandem quantities described above and the steps described above will yield the correct results for the tandem traffic.

Algorithm for Calculating the Minimum Number of Bearer Channel Media Processors

The minimum calculation applies the minPN result to the CSD result from above. This is an approximation to a much more complicated calculation.

1. $\text{BCMP\_USE} = CD + \dfrac{minPN - 1}{minPN} \times CSD$

2. Min BCMP=GOS(BCMP_USE)÷64, wherein the result is rounded up.

Algorithm for Calculating the Maximum Number of Bearer Channel Media Processors

The maximum number of Bearer Channel Media Processors (BCMP) is derived by calculating the number for each region, and then summing to get the class result.

1. $\text{BCMP\_USE}^R = CSD^{RR} \times \dfrac{PN^R - 1}{PN^R} + CSD^{OR} + CD^R$ 2. $BCMP^R$=GOS(BCMP_USER)÷64, wherein the result is rounded up.

3. $\text{Max\_BCMP} = \sum_R (BCMP^R, R \, \varepsilon \, C)$

Algorithm for Determining the Number of Media Modules and Media Gateways Required for a Network Region The following steps are used to determine the number of media modules and media gateways for each network region:

1. For T1, E1, and BRI trunk types, determine, based on port usages, the carried load and size of each trunk group of each type. Calculate the number of media modules required for each trunk group of each type using the algebra identified below.

2. For DCP stations, determine, based on port usages, the number and the carried load. Compute the number of DCP media modules required using the algebra identified below.

3. For analog trunks, determine, based on port usages, the carried load and size of each trunk group. For analog stations, determine the number and the carried load. Using the algebra identified below, compute the number of analog media modules required for the combined pool of stations and trunks.

4. Using the results of steps 1-3, calculate the G.711 DSP usage and resources using the equations below. This computation will require the percent for each codec type. For TS stations and trunks, assume that all calls require IP conversion. For IP stations and trunks, this computation will require the percent of traffic that shuffles.

5. Using the initial algebra below, determine the number of media gateways to support the media modules from steps 1-3. Determine the number of additional VoIP media modules required by the result of step 3. If additional DSP media modules are required, recalculate the number of media gateways.

6. Given the number of media gateways from step 5, determine the number of local survivable spare processors. This number will include the ICC, if applicable. Using the final algebra below, recalculate the number of media gateways. Repeat until the number of media gateways from the initial and final equations is the same.

7. Using the algebra below, check to see if there is sufficient media gateway capacity for tone detection.

8. Using the algebra below, check to see if there is sufficient media gateway capacity for announcements.

9. Calculate the data network impact using the algebra below.

The T1/E1 and BRI Media Module Calculation

For each network region:

1. Calculate the carried load, based on port usage, for each trunk group for each type of trunk (BRI, E1, T1).

Carried Load, in Erlangs=Number Busy Hour Calls per Group×CCS per call÷36

2. Using an appropriate Grade of Service or GOS method (e.g., P01 using an Erlang or retrial formula), calculate the number of trunks required for each group in Step 1.

3. Calculate the number of Media Modules or MMs for each trunk group for each type of TS trunk.

Number MMs per Group=Number Trunks per Group÷Trunks per MM, rounded up.

Trunks per MM=8 (BRI), 23 ($T1$ out of band), 24 ($T1$ in band), 30 ($E1$)

The DCP Media Module Calculation

For each network region:

1. Calculate the carried load, based on port usage, for DCP stations

Carried Load, in Erlangs=Number of Stations×Number Calls per Station×CCS per Call÷36

2. Calculate the number of DCP Media Modules.

Number DCP MMs=Number DCP Stations÷8, rounded up.

The Analog Media Module Calculation

For each network region:

1. Calculate the carried load, based on port usage, for each analog trunk group:

Carried Load, in Erlangs=Number of Busy Hour Calls per Group×CCS per Call÷36

2. Using an appropriate GOS method, calculate the number of trunks required for each group in Step 1.

3. Calculate the Carried Load for Analog Stations, determined based on port usage:

Carried Load, in Erlangs=Number of Stations×Number Calls per Stations×CCS per Call÷36

4. Calculate the Number of Analog MMs

Number of Analog MMs=Total Number of Analog Trunks (Step 2) and Stations÷8, rounded up The DSP Resource Calculation Let fSHF be the fraction of the IP load that shuffles, then for each network region:

1. Using the trunk group carried loads, based on port usage, calculate the trunk G711 load for each trunk group for each type of trunk.

For TS (or Time Slot) Trunk Groups, G.711 Load=TS Trunk Group Load×(2−fG711)

For IP Trunk Groups, G.711 Load=Number of Calls×
(10÷3600)×fSHF

Sum over all Trunk Groups

2. Using the station carried loads, based on port usage, calculate the G7.11 for each type of station.

For TS Stations, G7.11 Load=TS Station Load×(2−fG711)

For IP Stations, G.711 Load=Number of Calls×
(10÷3600)×fSHF

Sum over all Stations.

3. For an IP centric region, sum the Trunk and Station results to get the G7.11 carried load. Using an appropriate GOS method, calculate the number of G.711 DSPs required.

Number of DSP Resources=Number of G.711
DSPs÷64, rounded up.

4. For a TS centric region, sum the Trunk and Station results to get the G.711 carried load.

Number of DSP Resources=G.711 carried load÷43.0,
rounded up.

The Media Gateway Calculation, Initial

For each network region:

a) Sum the number of Media Modules from Steps 1 and 2. Calculate the initial number of MGs.

Initial Number of MGs=Number Media Modules÷4,
rounded up b) Check if Initial Number of MGs, Z Number of DSP Resources, from Step 3. If not, increment the number of Media Modules by (Number of DSP Resources−Initial Number of MGs) and perform the Step a) again to come up with an Initial Number of MGs.

The Media Gateway Calculation, Final

For each network region:

a) Given the current number of MGs, determine the number of LSPs (for stand alone systems, this should include the ICC).

b) Increment the Number of Media Modules by the LSP result from a). Update the current number of MGs.

Current Number of MGs=Number Media Modules÷4,
rounded up.

c) Repeat a) and b) until the number LSPs does not change.

Tone Detection Resource Calculation

For each network region:

a) Estimate the total carried load, based on port usage, on the resource. To this end, sum over all call classifier and tone detection types the following:

(Busy Hour Number of detections/classification)×
(Average Hold Time, in seconds)÷3600 b) Calculate the number of MGs required to provide Grade of Service. There are 8 ports per MG, which is 2.05 Erlangs @ P001, or 3.1 Erlangs @ P01.

No. MGs Required=(Carried Load, Step 1)÷(2.05 or
3.1), rounded up.

c) Compare this result with the initial MG number above.

Announcement Resource Calculation

For each network region:

a) Estimate the total carried load, determined based on port usage, on the resource. To this end, sum over all announcement types the following:

(Busy Hour Number of announcements)×(Average
Announcement Time, in seconds)÷3600 b) Calculate the number of ports required to provide GOS using the carried load from a).

c) Calculate the Number of MGs required to provide Grade of Service. There are 16 ports per MG.

No. MGs Required=(Ports Required, Step b)÷16,
rounded up.

d) Compare this result with the initial and final MG numbers above.

Data Network Impact Calculation

For each network region:

Let the One Way Voice Data rate or OWData for a codec be the look up result, given the codec and frame size, from the following table:

| Codec Type Size, in bytes | One Way Data Rate | Data Bytes per 30 ms frame | Total Frame |
|---|---|---|---|
| G.711 | 64 kbps | 240 | 298 |
| G.729 | 8 kbps | 30 | 88 |
| G.723.1 | 5.3 kbps | 20 | 78 |
| G723.1 | 6.4 kbps | 24 | 82 | a) For TS and IP station and trunk calls that send silence, compute:

2×OWData×number of calls×CCS per call÷36 b) For TS and IP calls that suppress silence, compute:

OWData×number of calls×CCS per call÷36 c) For IP calls that shuffle, divide the a) or b) result by 2.

d) Sum over the a), b), and c) results to get the data impact for the region, in Kbps. Sum the region results over all regions and divide by 1000. This is the data impact in Mbps. Sum the class results over all classes in the system. This is the system data impact, in Mbps.

Output of Network Analyzer

Applying the algebra above, the output of FIGS. 8-11 is provided. Referring to FIGS. 8 and 10, the configuration results include totals over all regions 800 and over all classes 804. The total over all regions 800 includes the number of busy hour calls ("BHCs"), the number of stations, the number of trunks, the number of port networks ("PNs"), the number of media gateways ("MGs"), the number of remote offices ("R300s"™), the number of signal channel media processors ("CLANs"), the number of bearer channel media processors ("Prwlers"), the call processor percent occupancy ("CP POE") caused by the busy hour calls, busy hour call limit ("BHC Limit"), IP voice traffic in kbps, and IP signaling traffic in kbps. The total over all classes 804 includes the number of network regions and classes, the number of signal channel media processors ("CLANs"), the minimum and maximum number of bearer channel media processors ("Prowlers"™), and the minimum and maximum number of port networks ("PNs").

Clicking on the "View Capacities" icon in FIGS. 8 and 10 provides respectively the outputs of FIGS. 9 and 11. These outputs provide configuration results 900 and system limits 904. The configuration results indicate the enterprise network's normal operating parameters while the system limits represent the maximum operating parameters. So long as the configuration results are less than the corresponding entries in the system limits, the enterprise network will not encounter overcapacity problems. When one or more of the configuration results equals or exceeds the corresponding entries in the system limits, the enterprise network has a high likelihood of encountering overcapacity problems.

The entries in the configuration results and system limits include call processor percent occupancy ("Call POE"), the number of port networks ("PNs"), the number of media gateways ("MGs"), the number of remote offices ("ROs"), the number of stations, the number of trunks, the number of H.323 endpoints ("H323 Eps"), the number of IP stations, the number of IP trunks, the number of network regions ("Netwrk Regs"), the number of signaling channel media processors ("CLANs"), the number of bearer channel media processors ("Prowlers"™), and the number of signaling groups ("Sig Groups").

An example of an overcapacity problem is shown in FIG. 11 in which the configuration result for call processor occupancy exceeds the system limit. In the same enterprise network, FIGS. 8 and 9 depict the output for a larger capacity Avaya Inc. S8700™ server while FIGS. 10 and 11 depict the output for a lower capacity Avaya Inc. R(G3r)™ server.

EXAMPLES

Single Region Example

Figure 12:
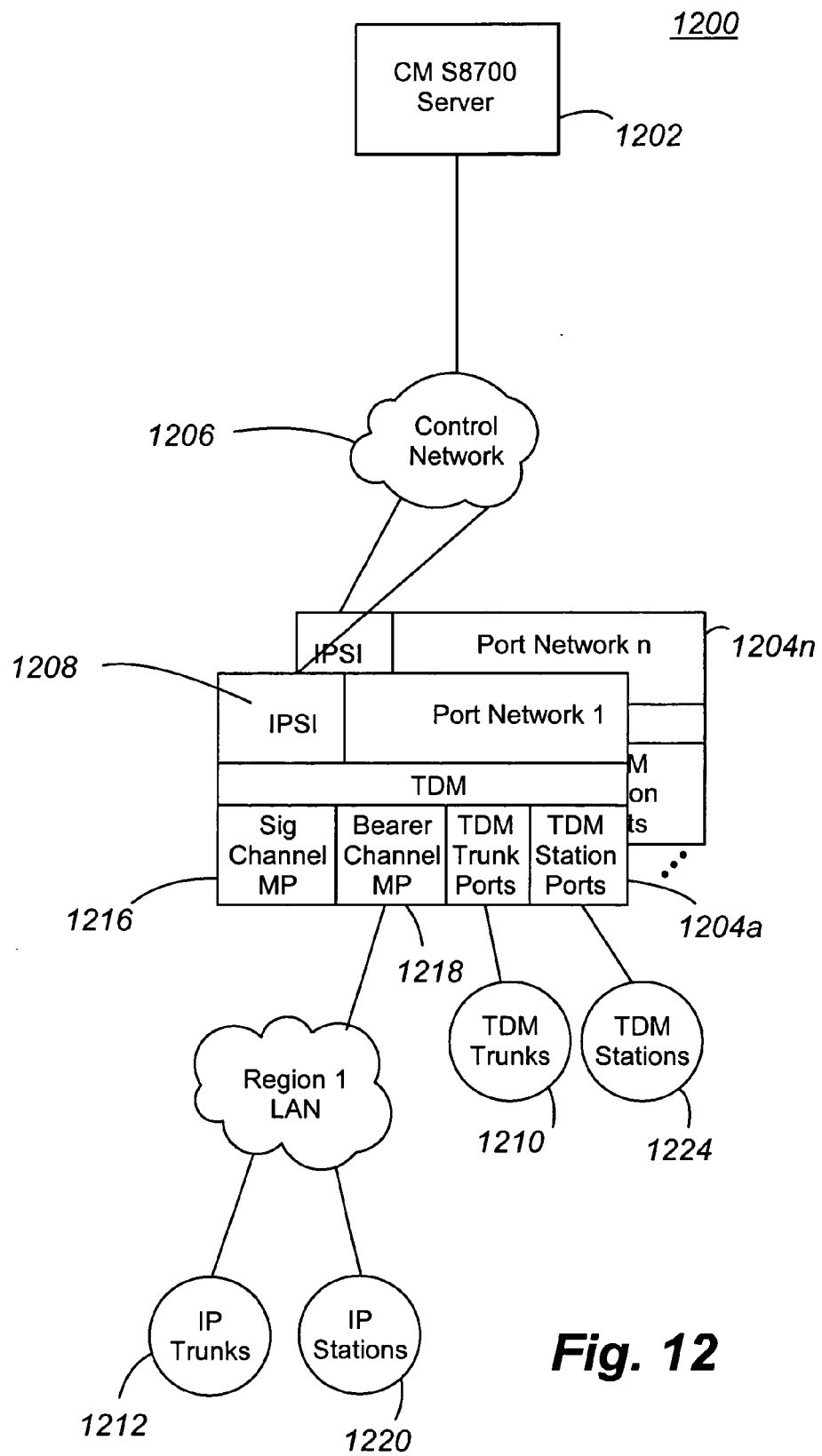
FIG. 12 is a block diagram of an enterprise network for a first single region example.

As a first example, consider an enterprise having a single-region system 1200 as shown in FIG. 12. In this example, the system 1200 comprises a server 1202, a plurality of port networks 1204a-n. The port networks 1204 are connected to the server 1202 through the control network 1206 and an IPSI 1208. The port networks are connected to the public switched telephone network (not shown) via (PSTN) TDM trunks 1210 and to other systems via IP (tie) trunks 1212. The port networks 1204 each include an IPSI 1214, signaling channel media processors 1216, and bearer channel media processors 1218. The port networks 1204 are collectively connected to IP stations 1220 and DCP stations 1224. DCP stations 1224 include 3600 DCP telephones. IP stations 1224 include 3600 IP phones. For this example, assume that each phone's busy hour usage is 2 CCS for IP (tie) trunk calls, 2 CCS for PSTN trunk calls, and 2 CCS for intercom calls. The IP phones prefer G.711, and the IP trunks prefer the G.729 codec. Inter PN calls will use the G.711 codec. Further, assume 24 CCS per IP trunk. Under these assumptions, the following values are calculated:

$I_{Sta}=600\ I_{Trk}=400,\ C_{Sta}=600,\ C_{Trk}=400,\ P_{Sta}=1200,$
$P_{Trk}=800,\ \text{and}\ P=2000,$ where all units are Erlangs. The number of IP trunks is 600.

By going through the algebra above the following results are obtained:

CC=500, IC=CI=500, II=500, CD=700, CSD=500.

From these values, the number of port networks required can be calculated as follows:

DLCI=3600+600/31=3620.                    1.

$n$=max((500+500/2)÷200, 3620÷2480)=4     2.

(500+1.75×250)÷4=235.                     3.

(500+1.8×250)÷5=190                       4.

minPN=maxPN=5.                            5.

Five port networks are required. If all of the stations and trunks were circuit ports, 8 to 10 would be required.

From the values calculated above, the number of bearer channel media processors required can also be calculated as follows:

BCMP_Use=700+⅘×500=1100.                  1.

GOS(1100)=1191.                           2.

Min_BCMP=Max_BCMP=1191÷64=19              3.

About 7 boards are required for the center stage function, and 12 for IP connectivity.

Where a G.729 is used for the center stage:

BCMP_Use=700+⅘×1000=1500.                 1.

GOS(1500)=1604.                           2.

Min_BCMP=Max_BCMP=1604÷64=25              3.

Now 13 boards are required for the center stage function.

Two Region Example

Figure 13:
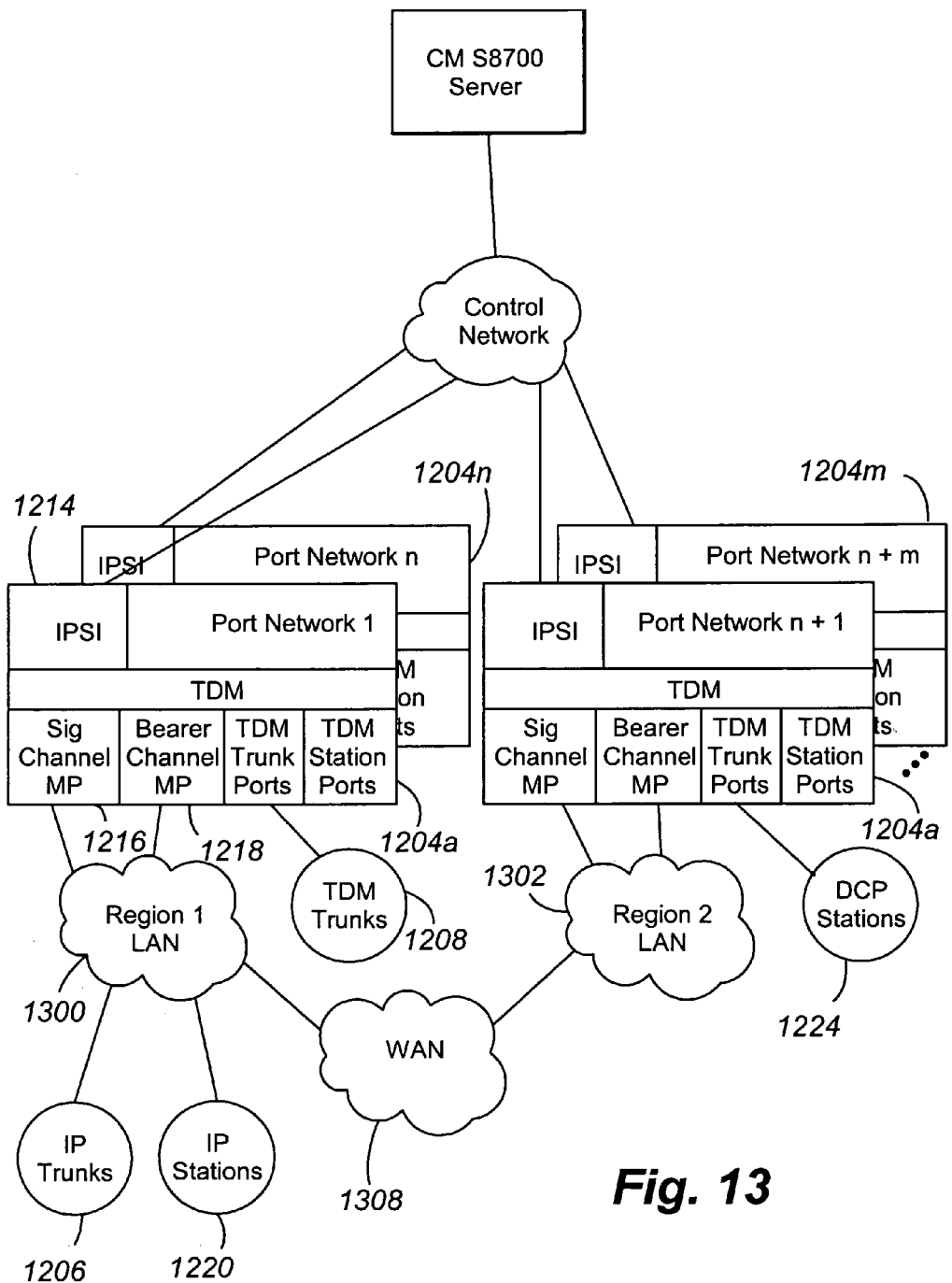
FIG. 13 is a block diagram of an enterprise network for a second dual region example.

This example is the same as the single region example, except that the DCP stations are in a separate region. FIG. 13 shows an example system 1300 comprising a first (primary) network region 1300 and a second region 1302 interconnected by the WAN 1308. As shown in FIG. 13, the first region 1300 includes port networks 1204a-n, IP stations 1220, IP trunks 1206, and TDM trunks 1208. The second region 1302 also includes port networks 1204a-m and DCP stations 1224. In this example, the intra-region inter-PN bearer traffic over LAN 1300 comprises the G.711 codec, and the inter-region inter-PN traffic over WAN 1308 comprises the G.729 codec.

For the first region 1306, $CI^R=200$, $CC^{RR}=0$, $CC^{RO}=200$, and the port network calculation is:

$DLCI^R$=3600+600/31=3620.                1.

$PN^R$=max(400÷200, 3620÷2480)=2          2.

For the second region 1306, $CI^R=300$, $CC^{RR}=100$, $CC^{RO}=200$, and the port network calculation is:

$DLCI^R$=0.                               1.

$n$=(300+200+100/2)÷200=3                 2.

(500+1.5×50)÷3=192                        3.

$PN^R$=3                                  4.

For the first region 1306, $CD^R=200$; $CSD^{RR}=0$, $CSD^{RO}=2×200=400$, and the bearer channel media processor calculation is:

BCMP_Use=200+400=600.                     1.

GOS(600)=669.                             2.

$BCMP^R$=879÷64=11                        3.

For the second region 1302, $CD^R=100+2×200=300$, $CSD^{RR}=100$, $CSD^{RO}=2×200=400$, and the bearer channel media processor calculation is:

BCMP_Use=300+400+1.5×100=850.             1.

GOS(650)=930.                             2.

$BCMP^R$=930÷64=15                        3.

The number of port networks is 5, the same as the single region case, but the number of media processors has increased to 26. If, however, the G.711 codec is the inter-region inter-PN codec, the number required falls to 20.

First Media Gateway Network Configuration Example

Figure 15:
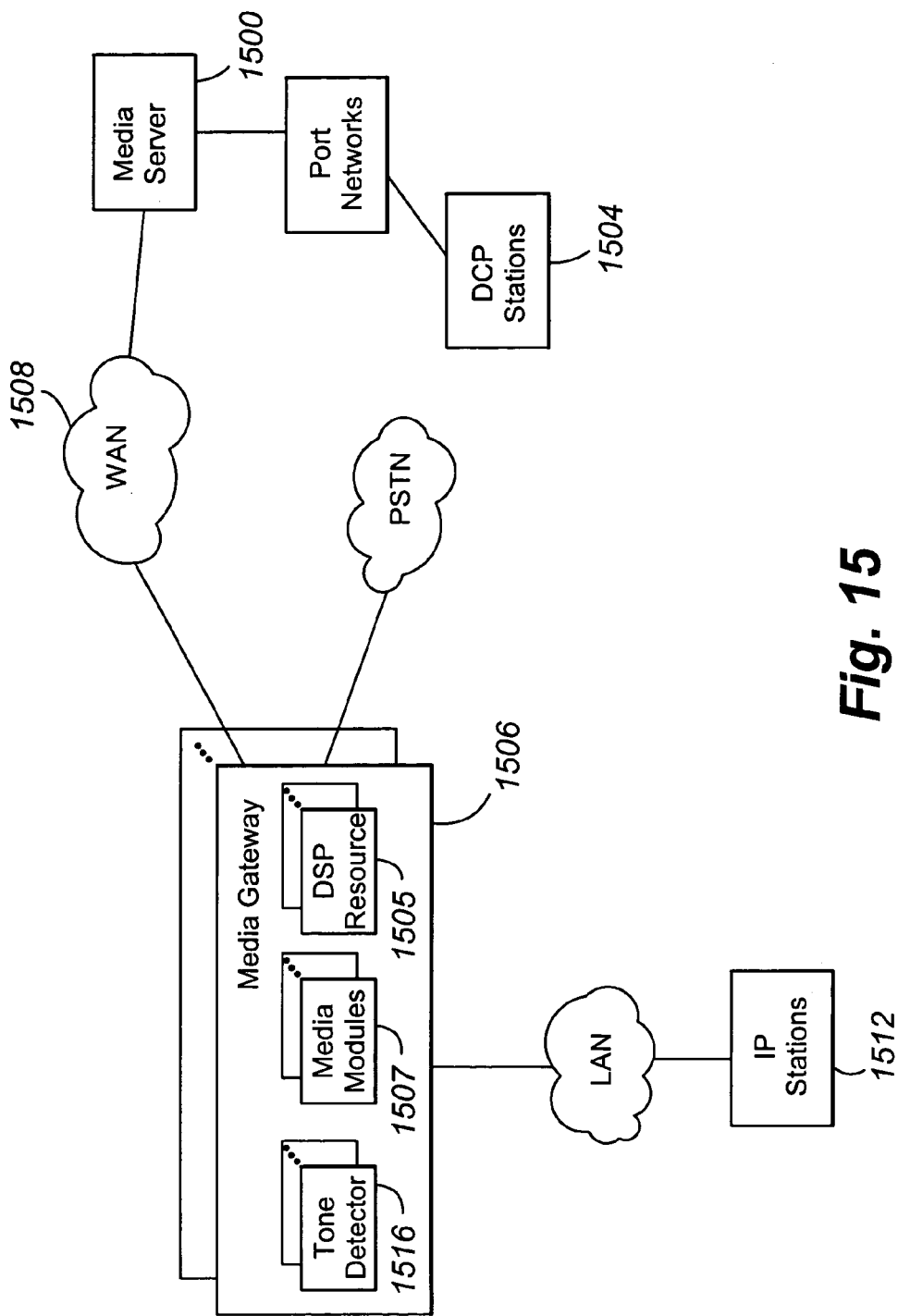
FIG. 15 is a block diagram of an enterprise network for a third example.

With reference to FIG. 15, an existing Avaya Inc. Definity G3r™ server 1500 with 4000 DCP stations 1504 is being expanded to connect to a new building across town via data WAN 1508 facilities. The new building will support 1000 IP telephones 1512, and all PSTN trunking is over T1 facilities. For all phones in the existing and new facilities, the call mix is (⅓, ⅓, ⅓), with four calls per station and 1.5 CCS per call. Trunk and local intercom calls use G.711, intercom across the WAN 1508 uses G.729, all with 30 ms frames. Assume all IP endpoints send silence.

Step 1. The T1 Media Module or MM 1507 Calculation for PSTN Trunks.

The PSTN trunk load is:

(⅔)(1000)(4)(1.5)/36=111.11 Erlangs.

EBC(111.11)=134 trunks for P01 grade of service. This means that 134/24=5.58, or 6 T1 MMs are required.

Step 2. The DSP Resource 1505 Calculation.

For Trunk calls, the G.711 usage is 111.11 Erlangs. For intercom, assume that ⅘ of the calls are to the main facility 1500 over the WAN (G.729) 1508, and that ⅕ local (G.711). Assume all intercom calls shuffle. The intercom G.711 DSP usage is:

(⅓)(1000)(4)(10/3600)(2×⅘+1×⅕)=6.67 Erlangs

The total G.711 use is 111.11+6.67=117.78. The number of DSP resources required, using the more conservative, or TS centric, calculation is (117.78/43.0)=2.74 or 3.

Step 3. The Media Gateway or MG 1516 Calculation.

To meet the requirements of Steps 1 and 2, two configurations are possible:

Two Media Gateways 1516, each with 3T1 MMs 1507. In this case, the DSP G.711 port usage is 117.78/2=58.9 Erlangs. Since this number is greater than the 43.0 Erlang design criteria, a VoIP MM is required in each of the MGs, for a total of 4 DSP resources, even through only 3 were required from the Step 2 calculation. With this configuration, there are no spare slots.

Three Media Gateways 1516, each with 2 MMs. Since each MG has an embedded DSP resource, no VoIP MMs are required. There are six spares (2 per MG) for future expansion.

Step 4. The Tone Detection Resource 1516 Calculation.

Tone detectors 1516 are required on incoming PSTN trunk calls. Suppose the average hold time is 4 seconds. The total tone detector usage is:

(⅓)(1000)(4)(4)÷36000=1.48 Erlangs.

The number of MGs required is: 1.48/2.05=0.72 or 1.

Step 5. The Data Network Impact Calculation.

Since silence is sent, an active G.711 call uses 2×79.5=159.0 Kbps, and an active G.729 uses 2×23.5=47.0 Kbps. There are 111.11 Erlangs of IP station to T1 trunk traffic, all of it G.711. There are 55.56 Erlangs of IP-IP traffic, four-fifths is G.729, one-fifth is G.711, and all of it shuffles. The calculation is:

[(111.11)(159.0)+(55.6)((⅘)(47.0)+(⅕)(159.0))÷2]÷1000=19.6 Mbps half duplex, or 9.8 Mbps, full duplex Second Media Gateway Network Configuration Example An enterprise has offices in five different states. Each office is to be configured to accommodate 100 DCP telephones and PSTN trunking in a stand alone system. Inter-office communication will be over H.323 tie trunks. The call mix is (½ enterprise, ¼ incoming from the PSTN, and ¼ outgoing to the PSTN), with 8 calls per hour per station and 2 CCS per call. Calls from a given station to another station in the enterprise are equally likely. Each office should have a LSP for backup. Local IP traffic is G.711 and WAN traffic is G.729, all with 30 ms frames. Assume all endpoints send silence.

The following calculations are for each office:

Step 1. The T1 mM Calculation for PSTN Trunks.

For each office, the PSTN trunk load is:

(½)(100)(8)(2)÷36+22.22 Erlangs

EBC(22.22)=34 trunks for P01 grade of service. This means that 34/24=1.42, or 2, T1 MMs are required.

Step 2. The DCP Station MM Calculation.

For each office, the DCP stations will require (100/8)= 12.5, or 13, DCP MMs. Station usage is 22.22 Erlangs.

Step 3. The DSP Resource Calculation.

For PSTN trunk calls, the G.711 usage is 22.22 Erlangs. For enterprise intercom, assume that ⅘ of the calls are over WAN IP trunks (G.729), and that ⅕ is local (G.711). The total G.711 use is:

22.22 (for PSTN trunks)+22.22×(⅕+2×⅕)(for enterprise intercom)=62.16 Erlangs.

The number of DSP resources required, using the more conservative, or TS centric, calculation is (62.16/43.0)=1.45, or 2.

Step 4. The Media Gateway Calculation.

Fifteen MMs are required for T1s (2), and stations (13). Thus, we will need at least four MGs, more than enough to supply the number of DSPs required (2). Two more slots are required for the ICC and the LSP, brining the number of MGs to 5. There are 3 spare slots.

Step 5. The Tone Detection Calculation.

Tone detectors are required on all PSTN trunk calls, on intra-office intercom calls (⅕ of enterprise intercom), and on outgoing inter-office intercom calls (⅖ of enterprise intercom). The busy hour traffic load is 400 PSTN calls, and 400 enterprise intercom calls. Suppose the average tone detector hold time is four seconds per call. The tone detector usage is then:

(400+400×(⅕+⅖)(4))÷3600=0.71 Erlangs

The total number of MGs required per office is 0.71/2.05=0.35, or 1.

Step 6. The Data Network Impact Calculation.

Since silence is sent, an active G.711 call uses 2×79.5=159.0 Kbps, and an active G.729 uses 2×23.5=47.0 Kbps. There are 22.22 Erlangs of Ti trunk traffic, all of it G.711 if converted to IP. There are 22.22 Erlangs of enterprise intercom traffic, four-fifths is G.729, and one-fifth is G.711, if converted to IP. To simplify, we assume 100% conversion. The calculation is:

[(22.22)(159.0)+(22.22)((⅘)(47.0)+(/15)(159.0))]÷1000=5.1 Mbps half duplex, or 2.5 Mbps, full duplex The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for determining a requirement in a converged communication system, comprising:
   a computer executable traffic study agent collecting information about respective usages of a plurality of Internet Protocol ("IP") stations, IP trunks, circuit-switched stations, and circuit-switched trunks in each of a plurality of interconnected network regions;
   a computer executable network analyzer determining, from the collected information, respective usages of a plurality of IP stations, IP trunks, circuit-switched stations, and circuit-switched trunks in each of the plurality of interconnected network regions;
   the network analyzer determining, based on the respective usages of the plurality of IP stations, IP trunks, circuit-switched stations, and circuit-switched trunks, a packet-switched port usage for at least one of: (i) a set of packet-switched stations, (ii) a set of packet-switched trunks, and (iii) a set of packet-switched communications, wherein packet-switched port usage is an amount of time a set of packet-switched ports are busy during a time period;
   the network analyzer determining, based on the respective usages of the plurality of IP stations, IP trunks, circuit-switched stations, and circuit-switched trunks, a circuit-switched port usage for at least one of: (i) a set of circuit-switched stations, (ii) a set of circuit-switched trunks, and (iii) a set of circuit-switched communications in at least a portion of an enterprise network, wherein circuit-switched port usage is an amount of time a set of circuit-switched ports are busy during the time period; and
   based on the determined packet-switched port usage and the determined circuit-switched port usage, the network analyzer determining, for a plurality of selected network regions, intra- and inter-network region traffic;
   the network analyzer determining, based on the intra- and inter-network region traffic, a functional component requirement to comply with a selected communication specification; and
   providing, based on the intra- and inter network region traffic, at least one of a system administration report and a diagnostic report.

2. The method of claim 1, wherein at least one of the determining comprise one or more of the substeps:
   determining respective usages of IP stations and IP trunks and, based on the respective usages of IP stations and IP trunks, packet-switched port usages for at least a first set of packet-switched stations and at least a first set of packet-switched trunks in at least a first network region of the plurality of selected network regions;
   determining respective usages of circuit-switched stations and circuit-switched trunks and, based on the respective usages of circuit-switched stations and circuit-switched trunks, circuit-switched port usages for at least a first set of circuit-switched stations and at least a first set of circuit-switched trunks in the at least a first network region; and
   determining, as a function of the packet-switched port usage and circuit-switched port usage, port usages for at least a first set of packet-switched communications and at least a first set of circuit-switched communications and wherein the functional component requirement is a number of at least one of port networks, media processors, media modules, digital signal processors, media gateways, tone detectors, announcement resources, time division multiplexed time slots, signaling sockets, and trunks.

3. The method of claim 2, wherein the at least a first network region comprises first and second regions that are strongly connected and third and fourth regions that are weakly connected and wherein the first and second regions are members of a first class and the third and fourth regions are members of a second class.

4. The method of claim 3, wherein the first, second, third, and fourth network regions are grouped into classes based on an inter region connection matrix showing connection strengths between selected pairs of network regions and wherein the port usage for the at least a first set of packet-switched communications is adjusted to reflect encoding by a selected codec.

5. The method of claim 2, wherein the at least a first set of packet-switched communications and the at least a first set of circuit-switched communications are determined at a class level, wherein the at least a first network region comprises a plurality of network regions, and wherein a class is a collection of connected network regions.

6. The method of claim 5, wherein the requirement is a number of port networks, wherein the at least a first set of packet-switched communications comprises circuit-switched to packet-switched communications and wherein the number of port networks is a function of at least one of (a) the sum of the port usages for the at least a first set of packet-switched communications and the at least a first set of circuit-switched communications and (b) a number of data link control identifiers.

7. The method of claim 5, wherein the requirement is a number of port networks and wherein the number of port networks is a function of at least one of (a) the sum of port usage by circuit-switched communications terminating on a port within the first network region, the port usage by circuit-switched communications terminating on a port outside of the first network region, and the port usage for the at least a first set of packet-switched communications and (b) a number of data link control identifiers.

8. The method of claim 5, wherein the requirement is a number of bearer channel media processors, wherein a port usage for the at least a first set of packet-switched communications is a selected codec equivalent, and wherein the number of bearer channel media processors is a function of at least one of (a) the selected codec equivalent port usage for the at least a first set of packet-switched communications and (b) a selected codec center stage data usage and a grade of service.

9. The method of claim 5, wherein the requirement is a number of bearer channel media processors and wherein the number of bearer channel media processors is a function of a plurality of (a) a selected codec center stage data usage within the first region, (b) a selected codec center stage data usage between regions, (c) a selected codec equivalent port usage for circuit-switched to packet-switched communications, and (d) a grade of service.

10. The method of claim 1, further comprising:
determining, based on at least one of the determined packet-switched port usage and the determined circuit-switched port usage, a carried load for first and second sets of trunks, the members of the first and second sets of trunks being at least one of the following trunk types Basic Rate Interface, E1 and T1;
determining a number of trunks required for the first and second sets of trunks based on a selected grade of service; and
determining a number of media modules for each of the first and second sets of trunks and for each type of trunk.

11. The method of claim 1, further comprising:
determining, based on at least one of the determined packet-switched port usage and the determined circuit-switched port usage, a carried load for the set of circuit-switched stations, the members of the set of circuit-switched stations being Digital Control Processor (DCP) station types; and
based on the carried load, determining a number of DCP media modules.

12. The method of claim 1, further comprising:
determining, based on at least one of the determined packet-switched port usage and the determined circuit-switched port usage, a first carried load for first and second sets of trunks, the members of the first and second sets of trunks being analog trunk types;
determining a number of trunks required for the first and second sets of trunks based on a selected grade of service;
determining, based on at least one of the packet-switched and circuit-switched port usage, a second carried load for the first set of stations, the members of the first set of stations being analog stations; and
based on the first and second carried loads, determining a number of analog media modules.

13. The method of claim 1, further comprising:
determining, based on at least one of the determined packet-switched port usage and the determined circuit-switched port usage, a trunk carried load for each of the first and second sets of trunks, the members of the first and second sets of trunks being different types of trunks;
determining, based on the trunk carried loads, a selected codec equivalent load for each of the first and second sets of trunks;
determining, based on at least one of the packet-switched and circuit-switched port usage, a station carried load for each of the first and second sets of stations;
determining, based on the station carried loads, a selected codec equivalent load for each of the first and second sets of stations;
for a determined network region of the plurality of selected network regions comprising the first and second sets of trunks and first and second sets of stations, summing the trunk carried loads and station carried loads to yield a selected codec carried load;
based on the selected codec carried load, determining a number of Digital Signal Processors or DSPs required for the selected codec;
determining a number of trunks required for the first and second sets of trunks based on a selected grade of service; and
determining a number of media modules for each of the first and second sets of trunks and for each type of trunk.

14. The method of claim 1, further comprising:
for at least one of T1, E1, and Basic Rate Interface or BRI trunk types, determining, based on at least one of the determined packet-switched port usage and the determined circuit-switched port usage, a trunk carried load and a size of each trunk set of each type;
for each of the at least one of T1, E1, and BRI trunk types and based on the trunk carried for that trunk type, determining a number of trunk media modules;
for Digital Control Processor or DCP stations, determining, based on at least one of the packet-switched and circuit-switched port usage, a DCP station carried load;
based on the DCP station carried load, determining a number of DCP media modules;
for analog trunks, determining, based on at least one of the packet-switched and circuit-switched port usage, an analog trunk carried load and a size of an analog trunk set;
for analog stations and based on the analog trunk, determining a number of analog stations and an analog station carried load, based on at least one of the packet-switched and circuit-switched port usage;
determining a number of analog media modules required for the analog trunks and analog stations;
determining a selected codec Digital Signal Processor or DSP usage based on a percent of traffic for the selected codec; and
determining a number of media gateways to support the trunk media modules, DCP media modules, and analog media modules.

15. The method of claim 14, further comprising:
based on the number of media gateways, determining a number of local survivable processors.

16. The method of claim 14, further comprising:
determining if the number of media gateways provides sufficient capacity for tone detection; and
determining if the number of media gateways provides sufficient capacity for announcements.

17. The method of claim 16, further comprising:
for the selected codec and frame size, determining a data impact for at least a first network region.

18. A system for determining a requirement in a converged communication system, comprising:
a processor with a memory operable to execute:
a traffic study agent operable to collect information about respective usages of a plurality of Internet Protocol ("IP") stations, IP trunks, circuit-switched stations, and circuit-switched trunks in each of a plurality of interconnected network regions;
a network analyzer operable to:
determine respective usages of a plurality of IP stations, IP trunks, circuit-switched stations, and circuit-switched trunks in each of the plurality of interconnected network regions;
determine, based on the respective usage of one or both of IP stations and IP trunks, a packet-switched port usage for at least one of (i) a set of packet-switched stations, (ii) a set of packet-switched trunks, and (iii) a set of packet-switched communications, wherein packet-switched port usage is an amount of time a set of packet-switched ports are busy during a time period;
determine, based on the respective usage of one or both of circuit-switched stations and circuit-switched trunks, a circuit-switched port usage for at least one of (i) a set of circuit-switched stations, (ii) a set of circuit-switched trunks, and (iii) a set of circuit-switched communications in at least a portion of an enterprise network, wherein circuit-switched port usage is an amount of time a set of circuit-switched ports are busy during the time period; and
based on the determined packet-switched and circuit-switched port usages, determine, for a plurality of selected network regions, intra- and inter-network region traffic; and
determine, based on the intra- and inter-network region traffic, a functional component requirement to comply with a selected communication specification; and
a resource report engine that is operable to provide, based on the intra- and inter network region traffic, at least one of a system administration report and a diagnostic report.

19. The system of claim 18, wherein at least one of the determining operations comprises at least one of the suboperations of:
determining respective usages of IP stations and IP trunks and, based on the respective usages of IP stations and IP trunks, packet-switched port usages for at least a first set of packet-switched stations and at least a first set of packet-switched trunks in at least a first network region of the plurality of selected network regions;
determining respective usages of circuit-switched stations and circuit-switched trunks and, based on the respective usages of circuit-switched stations and circuit-switched trunks, circuit-switched port usages for at least a first set of circuit-switched stations and at least a first set of circuit-switched trunks in the at least a first network region; and
determining, as a function of the packet-switched and circuit-switched port usages, port usages for at least a first set of packet-switched communications and at least a first set of circuit-switched communications and wherein the functional component requirement is a number of at least one of port networks, media processors, media modules, digital signal processors, media gateways, tone detectors, announcement resources, time division multiplexed time slots, signaling sockets, and trunks.

20. The system of claim 19, wherein the at least a first network region comprises first and second regions that are strongly connected and third and fourth regions that are weakly connected and wherein the first and second regions are members of a first class and the third and fourth regions are members of a second class.

21. The system of claim 20, wherein the first, second, third, and fourth network regions are grouped into classes based on an inter region connection matrix showing connection strengths between selected pairs of network regions and wherein the port usage for the at least a first set of packet-switched communications is adjusted to reflect encoding by a selected codec.

22. The system of claim 19, wherein the at least a first set of packet-switched communications and the at least a first set of circuit-switched communications are determined at a class level, wherein the at least a first network region comprises a plurality of network regions, and wherein a class is a collection of connected network regions.

23. The system of claim 22, wherein the requirement is a number of port networks, wherein the at least a first set of packet-switched communications comprises circuit-switched to packet-switched communications and wherein the number of port networks is a function of at least one of (a) the sum of the port usages for the at least a first set of packet-switched communications and the at least a first set of circuit-switched communications and (b) a number of data link control identifiers.

24. The system of claim 22, wherein the requirement is a number of port networks and wherein the number of port networks is a function of at least one of (a) the sum of port usage by circuit-switched communications terminating on a port within the first network region, the port usage by circuit-switched communications terminating on a port outside of the first network region, and the port usage for the at least a first set of packet-switched communications and (b) a number of data link control identifiers.

25. The system of claim 22, wherein the requirement is a number of bearer channel media processors, wherein a port usage for the at least a first set of packet-switched communications is a selected codec equivalent, and wherein the number of bearer channel media processors is a function of at least one of (a) the selected codec equivalent port usage for the at least a first set of packet-switched communications and (b) a selected codec center stage data usage and a grade of service.

26. The system of claim 22, wherein the requirement is a number of bearer channel media processors and wherein the number of bearer channel media processors is a function of a plurality of (a) a selected codec center stage data usage within the first region, (b) a selected codec center stage data usage between regions, (c) a selected codec equivalent port usage for circuit-switched to packet-switched communications, and (d) a grade of service.

27. The system of claim 18, wherein the network analyzer is further operable to:
determine, based on at least one of the packet-switched and circuit-switched port usage, a carried load for first and second sets of trunks, the members of the first and second sets of trunks being at least one of the following trunk types Basic Rate Interface, E1 and T1;
determine a number of trunks required for the first and second sets of trunks based on a selected grade of service; and
determine a number of media modules for each of the first and second sets of trunks and for each type of trunk.

28. The system of claim 18, wherein the network analyzer is further operable to:
determine, based on at least one of the packet-switched and circuit-switched port usage, a carried load for the set of circuit-switched stations, the members of the set of circuit-switched stations being Digital Control Processor (DCP) station types; and
based on the carried load, determine a number of DCP media modules.

29. The system of claim 18, wherein the network analyzer is further operable to:
determine, based on at least one of the packet-switched and circuit-switched port usage, a first carried load for first and second sets of trunks, the members of the first and second sets of trunks being analog trunk types;
determine a number of trunks required for the first and second sets of trunks based on a selected grade of service;
determine, based on at least one of the packet-switched and circuit-switched port usage, a second carried load for the first set of stations, the members of the first set of stations being analog stations; and
based on the first and second carried loads, determine a number of analog media modules.

30. The system of claim 18, wherein the network analyzer is further operable to:
  determine, based on at least one of the packet-switched and circuit-switched port usage, a trunk carried load for each of the first and second sets of trunks, the members of the first and second sets of trunks being different types of trunks;
  determine, based on the trunk carried loads, a selected codec equivalent load for each of the first and second sets of trunks;
  determine, based on at least one of the packet-switched and circuit-switched port usage, a station carried load for each of the first and second sets of stations;
  determine, based on the station carried loads, a selected codec equivalent load for each of the first and second sets of stations;
  for a determined network region of the plurality of selected network regions comprising the first and second sets of trunks and first and second sets of stations, sum the trunk carried loads and station carried loads to yield a selected codec carried load;
  based on the selected codec carried load, determine a number of Digital Signal Processors or DSPs required for the selected codec;
  determine a number of trunks required for the first and second sets of trunks based on a selected grade of service; and
  determine a number of media modules for each of the first and second sets of trunks and for each type of trunk.

31. The system of claim 18, wherein the network analyzer is further operable to:
  for at least one of T1, E1, and Basic Rate Interface or BRI trunk types, determine, based on at least one of the packet-switched and circuit-switched port usage, a trunk carried load and a size of each trunk set of each type;
  for each of the at least one of T1, E1, and BRI trunk types and based on the trunk carried for that trunk type, determine a number of trunk media modules;
  for Digital Control Processor or DCP stations, determine, based on at least one of the packet-switched and circuit-switched port usage, a DCP station carried load;
  based on the DCP station carried load, determine a number of DCP media modules;
  for analog trunks, determine, based on at least one of the packet-switched and circuit-switched port usage, an analog trunk carried load and a size of an analog trunk set;
  for analog stations and based on the analog trunk, determine a number of analog stations and an analog station carried load;
  determine a number of analog media modules required for the analog trunks and analog stations;
  determine a selected codec Digital Signal Processor or DSP usage based on a percent of traffic for the selected codec; and
  determine a number of media gateways to support the trunk media modules, DCP media modules, and analog media modules.

32. The system of claim 31, wherein the network analyzer is further operable to:
  based on the number of media gateways, determine a number of local survivable processors.

33. The system of claim 31, wherein the network analyzer is further operable to:
  determine if the number of media gateways provides sufficient capacity for tone detection; and
  determine if the number of media gateways provides sufficient capacity for announcements.

34. The system of claim 33, wherein the network analyzer is further operable to:
  for the selected codec and frame size, determine a data impact for at least a first network region.

35. An non-transitory computer readable medium having stored thereon a set of computer executable instructions, which, when executed by a computer system, cause the computer system to perform a method for determining a requirement in a converged communication system, comprising:
  computer readable and executable instructions to define two or more network regions;
  computer readable and executable instructions to group the two or more network regions into one or more classes;
  computer readable and executable instructions to determine the usages for one of packet-switched stations, packet-switched trunks, circuit-switched stations, and circuit-switched trunks from the one or more classes;
  based on the usages for the packet-switched stations and packet-switched trunks, computer readable and executable instructions to determine a packet-switched port usage for at least one of (i) a set of packet-switched stations, (ii) a set of packet-switched trunks, and (iii) a set of packet-switched communications, wherein packet-switched port usage is an amount of time a set of packet-switched ports are busy during a time period;
  based on usages for the circuit-switched stations and the circuit-switched trunks, computer readable and executable instructions to determine a circuit-switched port usage for at least one of (i) a set of circuit-switched stations, (i) a set of circuit-switched trunks, and (iii) a set of circuit-switched communications in at least a portion of an enterprise network, wherein circuit-switched port usage is an amount of time a set of circuit-switched ports are busy during the time period;
  based on packet-switched and circuit-switched port usages, computer readable and executable instructions to determine intra- and inter-network region traffic for the two or more network regions;
  based on the intra- and inter-network region traffic, computer readable and executable instructions to determine a functional component requirement to comply with a selected communication specification based on the determined packet-switched and circuit-switched port usages, wherein the function component requirement is at least one of processor occupancy, a number of signaling channel media processors, a number of bearer channel media processors, a number of port networks, a number of media gateways, and a number of media modules; and
  based on the intra- and inter network region traffic, computer readable and executable instructions to provide at least one of a system administration report and a diagnostic report.

* * * * *